US012799363B2

(12) United States Patent
Mae et al.

(10) Patent No.: US 12,799,363 B2
(45) Date of Patent: Nov. 17, 2026

(54) POLISHING COMPOSITION, POLISHING METHOD, AND METHOD FOR PRODUCING SEMICONDUCTOR SUBSTRATE

(71) Applicant: FUJIMI INCORPORATED, Aichi (JP)

(72) Inventors: Ryota Mae, Aichi (JP); Shota Suzuki, Aichi (JP)

(73) Assignee: FUJIMI INCORPORATED, Aichi (JP)

( * ) Notice: Subject to any disclaimer, the term of this patent is extended or adjusted under 35 U.S.C. 154(b) by 170 days.

(21) Appl. No.: 18/543,206

(22) Filed: Dec. 18, 2023

(65) Prior Publication Data

US 2024/0218208 A1 Jul. 4, 2024

(30) Foreign Application Priority Data

Dec. 26, 2022 (JP) ................................ 2022-208135

(51) Int. Cl.
*C09G 1/02* (2006.01)
*C09K 3/14* (2006.01)

(52) U.S. Cl.
CPC .............. *C09G 1/02* (2013.01); *C09K 3/1436* (2013.01)

(58) Field of Classification Search
None
See application file for complete search history.

(56) References Cited

U.S. PATENT DOCUMENTS

| | | | | |
|---|---|---|---|---|
| 10,508,222 | B2 | 12/2019 | Mizuno et al. | |
| 2009/0179172 | A1* | 7/2009 | Hirano | C09G 1/02 252/79.1 |
| 2018/0215953 | A1* | 8/2018 | Iwata | C09K 3/1463 |
| 2018/0258320 | A1* | 9/2018 | Yoshizaki | C09G 1/02 |
| 2018/0290262 | A1* | 10/2018 | Sato | B24B 37/044 |
| 2019/0300751 | A1* | 10/2019 | Izawa | C09G 1/02 |
| 2020/0308449 | A1* | 10/2020 | Mae | C09G 1/02 |
| 2022/0228001 | A1 | 7/2022 | Sugiyama et al. | |

FOREIGN PATENT DOCUMENTS

| | | | |
|---|---|---|---|
| JP | 2012040671 | A | 3/2012 |
| JP | 2020164780 | A | 10/2020 |
| JP | 2020178083 | A | 10/2020 |
| JP | 2022109944 | A | 7/2022 |
| JP | 2022-154454 | A | 10/2022 |

OTHER PUBLICATIONS

Office Action for JP Patent Application No. 2022-208135, with a mailing date of May 12, 2026.

* cited by examiner

*Primary Examiner* — Shamim Ahmed
(74) *Attorney, Agent, or Firm* — KATTEN MUCHIN ROSENMAN LLP

(57) ABSTRACT

An object of the present invention is to provide a polishing composition that can polish both silicon nitride and silicon oxide at a high polishing removal rate. Such a polishing composition contains abrasive grains and an acidic compound, wherein the abrasive grains are inorganic particles having an organic acid immobilized on its surface thereof and exhibiting a particle size distribution measured by a with a D90/D10 of 2.2 or more and a D50 of 70 nm or more.

18 Claims, No Drawings

POLISHING COMPOSITION, POLISHING METHOD, AND METHOD FOR PRODUCING SEMICONDUCTOR SUBSTRATE

TECHNICAL FIELD

The present invention relates to a polishing composition, a polishing method, and a method for producing a semiconductor substrate.

BACKGROUND ART

In recent years, new microfabrication techniques have been developed along with the increase in density and performance of LSI (large scale integration). Chemical mechanical polishing (CMP) is one of these techniques, and is frequently used in the LSI manufacturing process, in particular in the planarizing of interlayer insulating films in the multilayer wiring formation process, metal plug formation, and embedded wiring (damascene wiring) formation.

Such CMP has been applied in various processes in semiconductor production, and one example thereof includes application to a gate formation process in transistor production, for example. When producing a transistor, in some cases a Si-containing material such as silicon, a silicon oxide film (silicon oxide, $SiO_2$), polycrystalline silicon (polysilicon), or silicon nitride (silicon nitride, $Si_3N_4$) is polished.

For example, Japanese Patent Laid-Open No. 2012-40671 (corresponding to US Patent Application Publication No. 2013/0146804) discloses a polishing composition used for polishing silicon nitride, which contains colloidal silica on which an organic acid is immobilized, and which has a pH of 6 or less.

SUMMARY

Technical Problem

Recently, substrates containing both silicon oxide and silicon nitride have come into use, and there is an increasing demand for polishing both silicon oxide and silicon nitride at a high polishing removal rate in such substrates. However, with the technique described in Japanese Patent Laid-Open No. 2012-40671 (corresponding to US Patent Application Publication No. 2013/0146804), the polishing removal rate of silicon oxide is insufficient, and there is room for improvement.

Accordingly, an object of the present invention is to provide means that can polish both silicon oxide and silicon nitride at a high polishing removal rate.

Solution to Problem

To study the above problem, the inventors of the present invention conducted intensive studies. As a result, it has been found that the above problem may be solved by a polishing composition including abrasive grains and an acidic compound, wherein the abrasive grains are inorganic particles having an organic acid immobilized on a surface thereof, and in a particle size distribution of the abrasive grains measured by a dynamic light scattering method, D90/D10 is 2.2 or more and D50 is 70 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass, leading to completion of the present invention.

DESCRIPTION OF EMBODIMENTS

According to an embodiment of the present invention, a polishing composition is provided that includes abrasive grains and an acidic compound, wherein the abrasive grains are inorganic particles having an organic acid immobilized on a surface thereof, and in a particle size distribution of the abrasive grains measured by a dynamic light scattering method, D90/D10 is 2.2 or more and D50 is 70 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass. According to such a polishing composition of the present invention, both silicon oxide and silicon nitride can be polished at a high polishing removal rate.

Hereinafter, embodiments of the present invention will be described in detail. However, the present invention is not limited to the following embodiments, and can be variously modified within the scope of the aspects. The embodiments described in this specification can be freely combined to form other embodiments. In this specification, unless otherwise specified, operations and measurements of physical properties are performed at room temperature (20° ° C. or higher and 25° C. or lower)/relative humidity of 40% RH or higher and 50% RH or lower.

[Abrasive Grains]

The polishing composition according to the present invention includes abrasive grains. The abrasive grains have an action of mechanically polishing the object to be polished, and improve the polishing removal rate of the object to be polished by the polishing composition.

The abrasive grains according to an embodiment of the present invention are inorganic particles having an organic acid immobilized on a surface thereof. Further, in a particle size distribution of the abrasive grains measured by the dynamic light scattering method, D90/D10 is 2.2 or more and D50 is 70 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass.

<Inorganic Particles>

The type of the inorganic particles used for the abrasive grains of the present invention is not particularly limited. Specific examples of the inorganic particles include silica particles, zirconia particles, alumina particles, ceria particles, titania particles, silicon carbide particles, and the like.

These inorganic particles may be commercially available products or synthetic products. Further, the form of these inorganic particles is not particularly limited, and the inorganic particles may be in the form of particles that do not contain a dispersing medium or the like, may be in the form of a dispersion liquid, or may be in the form of a sol, gel, a colloid, and the like. More specific examples of the inorganic particles include a silica sol, colloidal silica, fumed silica, a zirconia sol, colloidal zirconia, fumed zirconia, an alumina sol, colloidal alumina, fumed alumina, a ceria sol, colloidal ceria, fumed ceria, a titania sol, colloidal titania, fumed titania, and the like.

Among the above inorganic particles, silica particles are preferred. As the silica particles, either dry silica particles or wet silica particles are preferably used. The silica particles can be easily produced by appropriately referring to known production methods. Further, commercially available silica particles may be used. Examples of methods for producing dry silica particles include a flame hydrolysis method, a vaporized metal combustion method, and a melting method. Examples of methods for producing wet silica particles (particularly colloidal silica particles) include a sodium silicate method and a sol-gel method. Silica particles produced by any production method can be suitably used as the silica particles of the present invention. Among these silica particles, wet silica particles are more preferred, and colloidal silica is further preferred. Moreover, as the production method, a sodium silicate method or a sol-gel method is preferred, and the sodium silicate method is further preferred from the viewpoint of obtaining silica particles that have a high true density.

In some embodiments, the silica particles are silica particles obtained by a sodium silicate method. The sodium silicate method is a method in which, typically, activated silicic acid obtained by ion-exchanging an aqueous alkali silicate solution such as water glass is used as a raw material to grow particles from the activated silicic acid.

In some embodiments, the silica particles are silica particles obtained by a sol-gel method. The sol-gel method is a method in which an amorphous gel is obtained by, using an organic compound solution of a metal as a starting material, forming a sol in which fine particles of a metal oxide or hydroxide are dissolved by converting the solution through hydrolysis and polycondensation of the compound in the solution, and then allowing the reaction to further proceed to form a gel.

In some embodiments, the silica particles are silica particles obtained by a vaporized metal combustion method (VMC method). The vaporized metal combustion method (VMC method) involves burning a combustion aid (hydrocarbon gas and the like) with a burner in an oxygen-containing atmosphere to form a chemical flame, and then putting metal silica into the chemical flame in an amount that will form a dust cloud to cause an explosion, thereby obtaining silica particles.

In some embodiments, the raw material silica particles are silica particles obtained by a melting method. The melting method is a method of obtaining silica particles by putting silica into a melting, and then cooling.

<Inorganic Particles Having an Organic Acid Immobilized on a Surface Thereof>

The abrasive grains of the present invention are inorganic particles having an organic acid immobilized on a surface thereof. The "inorganic particles having an organic acid immobilized on a surface thereof" are inorganic particles having an organic acid chemically bonded to the surface.

In the inorganic particles having an organic acid immobilized on a surface thereof, the inorganic particles described above are used as the inorganic particles before the organic acid is immobilized. As described above, the inorganic particles are preferably silica particles, more preferably wet silica particles, and further preferably colloidal silica. In the following description of the synthesis method, an example is described in which the inorganic particles are colloidal silica, and an organic acid is immobilized on the surface thereof.

In colloidal silica having an organic acid immobilized on a surface thereof, examples of the organic acid include, but are not limited to, sulfonic acid, carboxylic acid, phosphoric acid, and the like. Among these, at least one of sulfonic acid and carboxylic acid is preferred, and sulfonic acid is more preferred. The surface of the colloidal silica on which an organic acid is immobilized has an acidic group derived from the above-described organic acids (for example, a sulfo group, a carboxy group, a phosphoric acid group, and the like) immobilized thereon by a covalent bond (in some cases via a linker structure).

As the colloidal silica having an organic acid immobilized on a surface thereof, a synthetic product or a commercially available product may be used. Further, the colloidal silica having an organic acid immobilized on a surface thereof may be used alone or in combination of two or more.

Examples of the method of immobilizing the organic acid on the surface of the colloidal silica particles include, but are particularly limited to, a method in which a functional group such as a mercapto group or an aldehyde group is introduced onto the surface of the colloidal silica, and then oxidized into a sulfonic acid or carboxylic acid. Another example is a method in which a functional group having a protective group bonded to an acidic group derived from an organic acid is introduced onto the surface of the colloidal silica, and then the protective group is removed. The compound used to introduce the organic acid onto the colloidal silica surface has at least one functional group that can become an organic acid group, and preferably includes a functional group that can be used to bond with a hydroxyl group on the colloidal silica surface, a functional group introduced to control a hydrophobicity/hydrophilicity, a functional group introduced to control steric bulk, and the like.

As a specific method for synthesizing colloidal silica in which an organic acid is immobilized on a surface thereof, if sulfonic acid, which is a type of organic acid, is to be immobilized on the surface of the colloidal silica, for example, a method described in "Sulfonic acid-functionalized silica through quantitative oxidation of thiol groups", Chem. Commun. 246-247 (2003). can be adopted. Specifically, colloidal silica having sulfonic acid immobilized on a surface thereof can be obtained by coupling a silane coupling agent having a thiol group such as 3-mercaptopropyltrimethoxysilane and/or a silane coupling agent having a sulfide group to the colloidal silica and then oxidizing the thiol group and/or the sulfide group with hydrogen peroxide. Examples of the silane coupling agent having a thiol group (mercapto group) include, in addition to the above-mentioned 3-mercaptopropyltrimethoxysilane, 2-mercaptopropyltriethoxysilane, 2-mercaptoethyltrimethoxysilane, 2-mercaptoethyltriethoxysilane, and the like. Further, examples of the silane coupling agent having a sulfide group include bis(3-triethoxysilylpropyl) disulfide and the like.

If carboxylic acid is to be immobilized on the surface of the colloidal silica, for example, a method described in "Novel Silane Coupling Agents Containing a Photolabile 2-Nitrobenzyl Ester for Introduction of a Carboxy Group on the Surface of Silica Gel", Chemistry Letters, 3, 228-229 (2000) can be adopted. Specifically, colloidal silica having carboxylic acid immobilized on a surface thereof can be obtained by coupling a silane coupling agent containing a photoreactive 2-nitrobenzyl ester to silica and then irradiating the silica with light.

<D10, D50, and D90 of Abrasive Grains>

In the present invention, in the particle size distribution of the abrasive grains (inorganic particles having an organic acid immobilized on a surface thereof) measured by the dynamic light scattering method, D90/D10 is 2.2 or more and D50 is 70 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass.

A larger numerical value of D90/D10 represents that the particle size distribution of the abrasive grains is wider. If D90/D10 is less than 2.20, the particle size distribution of the abrasive grains is narrow, and the effects of the present invention are not obtained. D90/D10 is preferably 2.23 or more, more preferably 2.25 or more, further preferably 2.28 or more, still further preferably 2.30 or more, even still further preferably 2.40 or more, and particularly preferably 2.45 or more. The upper limit of D90/D10 is not particularly limited, but is preferably 5.0 or less, more preferably 4.5 or less, further preferably 4.0 or less, still further preferably 3.8 or less, even still further preferably 3.5 or less, and particularly preferably 3.0 or less.

That is, the D90/D10 of the abrasive grains is preferably 2.23 or more and 5.0 or less, more preferably 2.25 or more and 4.5 or less, further preferably 2.28 or more and 4.0 or less, still further preferably 2.30 or more and 3.8 or less, even still further preferably 2.40 or more and 3.5 or less, and particularly preferably 2.45 or more and 3.0 or less.

In the present invention, the D50 of the abrasive grains is 70 nm or more. If D50 is less than 70 nm, the effects of the present invention are not obtained. The D50 of the abrasive grains is preferably 75 nm or more, more preferably 80 nm or more, further preferably 85 nm or more, and particularly preferably 88 nm or more. Further, in some embodiments, the D50 of the abrasive grains is not particularly limited, but is preferably 250 nm or less, more preferably 200 nm or less, further preferably 180 nm or less, and particularly preferably 150 nm or less. Within this range, the effects of the present invention can be more effectively exhibited.

That is, the D50 of the abrasive grains is preferably 75 nm or more and 250 nm or less, more preferably 80 nm or more and 200 nm or less, further preferably 85 nm or more and 180 nm or less, and particularly preferably 88 nm or more and 150 nm or less.

In some embodiments, the D10 of the abrasive grains is, although not particularly limited as long as the above D90/D10 satisfies the scope of the present invention, preferably 40 nm or more, more preferably 45 nm or more, further preferably 50 nm or more, and particularly preferably 55 nm or more. Further, in some embodiments, the D10 of the abrasive grains is, although not particularly limited as long as the above D90/D10 satisfies the scope of the present invention, preferably 130 nm or less, more preferably 120 nm or less, further preferably 100 nm or less, and particularly preferably 90 nm or less. Within such a range, the effects of the present invention can be more effectively exhibited.

That is, the D10 of the abrasive grains is preferably 40 nm or more and 130 nm or less, more preferably 45 nm or more and 120 nm or less, further preferably 50 nm or more and 100 nm or less, and particularly preferably 55 nm or more and 90 nm or less.

In some embodiments, the D90 of the abrasive grains is, although not particularly limited as long as the above D90/D10 satisfies the scope of the present invention, preferably 100 nm or more, more preferably 120 nm or more, further preferably 130 nm or more, and particularly preferably 140 nm or more. In some embodiments, the D90 of the abrasive grains is, although not particularly limited as long as the above D90/D10 satisfies the scope of the present invention, preferably 350 nm or less, more preferably 300 nm or less, further preferably 280 nm or less, and particularly preferably 250 nm or less. Within this range, the effects of the present invention can be more effectively exhibited.

That is, the D90 of the abrasive grains is preferably 100 nm or more and 350 nm or less, more preferably 100 nm or more and 300 nm or less, further preferably 120 nm or more and 280 nm or less, and particularly preferably 130 nm or more and 250 nm or less.

In this specification, as described above, the D10, D50, and D90 of the abrasive grains are values calculated from the particle size distribution of the abrasive grains measured by the dynamic light scattering method. More specifically, the particle size distribution of the abrasive grains can be measured by the method described in the Examples.

The D10, D50, and D90 of the abrasive grains can be controlled by appropriately selecting the synthesis method of the raw material inorganic particles before immobilizing the organic acid, by mixing a plurality of types of the abrasive grains, or the like. For example, by increasing the D10, D50, and D90 of the colloidal silica used as the raw material of the abrasive grains, the D10, D50, and D90 of the abrasive grains can be increased.

In some embodiments, the average primary particle size of the abrasive grains is not particularly limited, but is preferably 25 nm or more, more preferably 30 nm or more, further preferably 35 nm or more, and particularly preferably 40 nm or more. Further, in an embodiment of the present invention, the average primary particle size of the abrasive grains is not particularly limited, but is preferably 120 nm or less, more preferably 100 nm or less, further preferably 80 nm or less, and particularly preferably 70 nm or less. When the average primary particle size of the abrasive grains is within such a range, the effects of the present invention can be exhibited even more.

That is, the average primary particle size of the abrasive grains is preferably 25 nm or more and 120 nm or less, more preferably 30 nm or more and 100 nm or less, further preferably 35 nm or more and 80 nm or less, and particularly preferably 40 nm or more and 70 nm or less. In this specification, the value of the average primary particle size of the abrasive grains is a value calculated from the specific surface area of the abrasive grains measured by the BET method and the density of the abrasive grains, and more specifically this value can be measured by the method described in the Examples.

In some embodiments, the average secondary particle size of the abrasive grains is not particularly limited, but is preferably 60 nm or more, more preferably 65 nm or more, further preferably 70 nm or more, and particularly preferably 75 nm or more. In some embodiments, the average secondary particle size of the abrasive grains is not particularly limited, but is preferably 250 nm or less, more preferably 200 nm or less, further preferably 150 nm or less, and particularly preferably 120 nm or less. Within this range, the effects of the present invention can be exhibited even more.

That is, the average secondary particle size of the abrasive grains is preferably 60 nm or more and 250 nm or less, more preferably 65 nm or more and 200 nm or less, further preferably 70 nm or more and 150 nm or less, and particularly preferably 75 nm or more and 120 nm or less. In this specification, the value of the average secondary particle size of the abrasive grains is a value measured by the dynamic light scattering method, and more specifically, it can be measured by the method described in the Examples.

In some embodiments, the average degree of association (average secondary particle size/average primary particle size) of the abrasive grains is preferably 1.3 or more, more preferably 1.4 or more, and further preferably 1.5 or more, and particularly preferably 1.6 or more. Further, in some embodiments, the average degree of association of the abrasive grains is preferably 4.0 or less, more preferably 3.5 or less, further preferably 3.0 or less, and particularly preferably 2.5 or less.

That is, the average degree of association of the abrasive grains is preferably 1.3 or more and 4.0 or less, more preferably 1.4 or more and 3.5 or less, further preferably 1.5 or more and 3.0 or less, and particularly preferably 1.6 or more and 2.5 or less.

In some embodiments, the upper limit of the aspect ratio of the abrasive grains is not particularly limited, but is preferably 2.0 or less, more preferably less than 2.0, further preferably 1.8 or less, and particularly preferably 1.6 or less. Within this range, defects on the surface of the object to be polished can be further reduced. The aspect ratio is the average of the values obtained by taking the smallest rectangle circumscribing an image of each abrasive grain using a scanning electron microscope and dividing the length of the long side of that rectangle by the length of the short side of the same rectangle. The aspect ratio can be determined using general image analysis software. The lower limit of the aspect ratio of the abrasive grains is not particularly limited, but is preferably 1.0 or more.

In some embodiments, the true density of the abrasive grains is preferably 1.7 $g/cm^3$ or more, more preferably 1.8 $g/cm^3$ or more, further preferably 1.9 $g/cm^3$ or more, and particularly preferably 2.0 $g/cm^3$ or more. If the true density is high, a higher mechanical force can be transferred onto the object to be polished, and thus polishing removal rate can be improved even further. In addition, in some embodiments, the true density of the abrasive grains is not particularly limited, but is preferably 3.0 $g/cm^3$ or less, more preferably 2.8 $g/cm^3$ or less, further preferably 2.5 $g/cm^3$ or less, and particularly preferably 2.3 $g/cm^3$ or less.

That is, the true density of the abrasive grains is preferably 1.7 $g/cm^3$ or more and 3.0 $g/cm^3$ or less, more preferably 1.8 $g/cm^3$ or more and 2.8 $g/cm^3$ or less, further preferably 1.9 $g/cm^3$ or more and 2.5 $g/cm^3$ or less, and particularly preferably 2.0 $g/cm^3$ or more and 2.3 $g/cm^3$ or less. The true density can be controlled by appropriately selecting the method for producing the abrasive grains and appropriately selecting the production conditions (reaction temperature and reaction time). In this specification, the true density is a value measured by the method described in the Examples.

In some embodiments, the number of silanol groups per unit surface area of the abrasive grains (silanol group density) is not particularly limited, but is preferably more than 0 groups/$nm^2$, more preferably 0.5 groups/$nm^2$ or more, further preferably 1.0 groups/$nm^2$ or more, and particularly preferably 1.2 groups/$nm^2$ or more. In some embodiments, the silanol group density of the abrasive grains is not particularly limited, but is preferably 9.0 groups/$nm^2$ or less, more preferably 5.0 groups/$nm^2$ or less, further preferably 3.0 groups/$nm^2$ or less, and particularly preferably 2.0 groups/$nm^2$ or less.

That is, the number of silanol groups per unit surface area of the abrasive grains (silanol group density) is preferably more than 0 groups/$nm^2$ and 9.0 groups/$nm^2$ or less, more preferably 0.5 groups/$nm^2$ or more and 5.0 groups/$nm^2$ or less, further preferably 1.0 groups/$nm^2$ more and 3.0 groups/$nm^2$ or less, and particularly preferably 1.2 groups/$nm^2$ or more and 2.0 groups/$nm^2$ or less. The silanol group density can be reduced by performing a heat treatment such as calcination when producing the abrasive grains, and can also be controlled by adjusting the amount of organic acid immobilized on the surface of the abrasive grains, and the like. In this specification, the silanol group density is a value measured by the method described in the Examples.

In some embodiments, the zeta potential (ζ potential) of the abrasive grains in the polishing composition is not particularly limited, but is preferably −60 mV or more, more preferably −50 mV or more, further preferably −40 mV or more, and particularly preferably −35 mV or more. Further, the zeta potential (ζ potential) of the abrasive grains is not particularly limited, but is preferably less than 0 mV, more preferably −5 mV or less, further preferably −10 mV or less, and particularly preferably −20 mV or less. That is, the zeta potential (ζ potential) of the abrasive grains in the polishing composition is preferably −60 mV or more and less than 0 mV, more preferably −50 mV or more and −5 mV or less, further preferably −40 mV or more and −10 mV or less, and particularly preferably −35 mV or more and −20 mV or less. The zeta potential of the abrasive grains can be controlled by adjusting the amount of organic acid immobilized on the surface, the pH of the polishing composition, and the like. In this specification, the zeta potential of the abrasive grains is a value measured by the method described in the Examples.

The shape of the abrasive grains is not particularly limited, and may be spherical or non-spherical. Specific examples of non-spherical shapes are not particularly limited, and include various shapes such as polygonal prisms like a triangular prism and a square prism, a cylindrical shape, a bale-like shape where a center portion of a cylinder bulges out more than the ends, a donut-like shape with a center portion of a disk penetrating therethrough, a plate-like shape, a so-called cocoon-like shape with a constriction in the center, a so-called associative spherical shape having a plurality of particles integrated together, a so-called confetti-like shape having a plurality of protrusions on the surface, and a rugby ball shape. However, from the viewpoint of further improving the effects of the present invention, the abrasive grains preferably have a cocoon-like shape.

The concentration (content) of the abrasive grains in the polishing composition is not particularly limited. In the case of a polishing composition that is used as-is as a polishing liquid for polishing an object to be polished (typically a polishing liquid in the form of a slurry, sometimes referred to as working slurry or polishing slurry), the lower limit of the concentration (content) the abrasive grains in the polishing composition is, relative to the total mass of the polishing composition, preferably 0.1% by mass or more, more preferably 0.5% by mass or more, further preferably 0.6% by mass or more, still further preferably 0.8% by mass or more, and particularly preferably 1% by mass or more. Further, the upper limit of the concentration (content) of the abrasive grains in the polishing composition: relative to the total mass of the polishing composition, preferably 15% by mass or less, more preferably 10% by mass or less, further preferably 8% by mass or less, still further preferably 6% by mass or less, and particularly preferably 5% by mass or less.

That is, the concentration (content) of the abrasive grains is, relative to the total mass of the polishing composition, preferably 0.1% by mass or more and 15% by mass or less, more preferably 0.5% by mass or more and 10% by mass or less, further preferably 0.6% by mass or more and 8% by mass or less, still further preferably 0.8% by mass or more and 6% by mass or less, and particularly preferably 1% by mass or more and 5% by mass or less.

In addition, in the case of a polishing composition that is used for polishing by diluting it (that is, a concentrated solution, a working slurry stock solution), from the viewpoint of storage stability and filtration properties and the like, usually, a suitable concentration (content) of the abrasive grains is 30% by mass or less, and 25% by mass or less is more preferred. Further, from the viewpoint of utilizing the benefits of using a concentrated solution, the concentration (content) of the abrasive grains is preferably more than 1% by mass, and more preferably 2% by mass or more.

When the polishing composition includes two or more types of the abrasive grains, the concentration (content) of the abrasive grains is intended to be the total amount of those.

<Abrasive Particles>

In some embodiments, within a range that does not impede the effects of the present invention, the polishing composition according to the present invention may further contain abrasive particles other than the above-described abrasive grains. Such abrasive particles may be any of inorganic particles, organic particles, and organic-inorganic composite particles. Specific examples of the inorganic particles include silica, such as colloidal silica, fumed silica, and precipitated silica, but the abrasive particles may also be inorganic particles other than silica such as zirconia, alumina, and titania. Specific examples of the organic particles include polymethyl methacrylate (PMMA) particles. The abrasive particles may be used alone or in combination of two or more. Further, commercially products or synthetic products may be used as the abrasive particles.

[Acidic Compound]

The polishing composition according to the present invention includes an acidic compound. The acidic compound can be used as a pH adjusting agent.

The acidic compound is not particularly limited, and examples include known inorganic acids and organic acids. Examples of the inorganic acids include nitric acid, sulfuric acid, hydrochloric acid, hydrofluoric acid, boric acid, carbonic acid, hypophosphorous acid, phosphorous acid, phosphoric acid, and the like. Examples of the organic acids include formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furandicarboxylic acid, 3-furancarboxylic acid, 2-tetrahydrofurancarboxylic acid, methoxyacetic acid, methoxyphenylacetic acid, phenoxyacetic acid, and the like. These acidic compounds may be used alone or in combination of two or more.

Among these acidic compounds, from the viewpoint of not interfering with the polishing of silicon nitride, it is preferred to include an inorganic acid. Further, as the inorganic acid, at least one selected from the group consisting of nitric acid, sulfuric acid, and hydrochloric acid is more preferred.

The concentration (content) of the acidic compound in the polishing composition is not particularly limited, and can be appropriately set so that the polishing composition has a desired pH as described below.

<Basic Compound>

In some embodiments, the polishing composition may further include a basic compound within a range that provides the desired pH described below.

Specific examples of the basic compound include hydroxides or salts of Group 2 elements or alkali metals, quaternary ammonium compounds, ammonia, and amines. Here, the Group 2 elements are not particularly limited, but Ca (calcium), Sr (strontium), Ba (barium), and the like can be preferably used.

Among the hydroxides or salts of Group 2 elements or alkali metals, an example of a more preferred Group 2 element is calcium, and examples of the alkali metals include potassium, sodium, and the like. Examples of the salts include carbonates, hydrogen carbonates, sulfates, acetates, and the like. Examples of the hydroxides or salts of Group 2 elements or alkali metals include calcium hydroxide, potassium hydroxide, potassium carbonate, potassium hydrogen carbonate, potassium sulfate, potassium acetate, potassium chloride, sodium hydroxide, ammonium hydrogen carbonate, ammonium carbonate, sodium hydrogen carbonate, sodium carbonate, and the like.

Examples of the quaternary ammonium compounds include hydroxides such as tetramethylammonium, tetraethylammonium, and tetrabutylammonium, and salts such as chlorides, carbonates, sulfates, and phosphates. Specific examples include tetraalkylammonium hydroxides such as tetramethylammonium hydroxide, tetraethylammonium hydroxide, and tetrabutylammonium hydroxide, tetraalkylammonium hydroxide salts such as carbonate and tetramethylammonium tetramethylammonium chloride, and the like.

Specific examples of the amines include methylamine, dimethylamine, trimethylamine, ethylamine, diethylamine, triethylamine, ethylenediamine, monoethanolamine, N-(β-aminoethyl) ethanolamine, hexamethylenediamine, diethylenetriamine, triethylenetetramine, anhydrous piperazine, piperazine hexahydrate, 1-(2-aminoethyl) piperazine, N-methylpiperazine, guanidine, and the like.

<pH>

In some embodiments, the pH of the polishing composition according to the present invention is preferably 0.8 or more, more preferably 1 or more, further preferably 1.5 or more, and particularly preferably 2 or more. Further, in some embodiments of the present invention, the pH of the polishing composition is preferably less than 7, more preferably less than 5, further preferably 4.5 or less, and still further preferably less than 4.

That the pH of the polishing composition according to the present invention is preferably 0.8 or more and less than 7, more preferably 1 or more and less than 5, further preferably 1.5 or more and less than 4.5, and particularly preferably 2 or more and less than 4. If the pH of the polishing composition is within this range, the polishing removal rate of the silicon oxide and the silicon nitride can be maintained at a high level.

The pH of the polishing composition can be measured, for example, using a pH meter, and more specifically, by the method described in the Examples.

<Electrical Conductivity>

In some embodiments, the electrical conductivity (EC) of the polishing composition according to the present invention is not particularly limited, but is preferably 0.1 mS/cm or more, and more preferably 0.5 mS/cm or more. Further, in some embodiments, the electrical conductivity (EC) of the polishing composition according to the present invention is preferably 20 mS/cm or less, and more preferably 10 mS/cm or less.

That is, the electrical conductivity (EC) of the polishing composition according to the present invention is preferably 0.5 mS/cm or more and 20 mS/cm or less, and more preferably 0.5 mS/cm or more and 10 mS/cm or less. If the electrical conductivity (EC) of the polishing composition is within this range, the polishing removal rate of the silicon oxide and the silicon nitride can be maintained at a high level. In addition, it is possible to appropriately adjust the repulsion between the abrasive grains and ensure stability. The electrical conductivity of the polishing composition can be adjusted based on the type and amount of the acidic compound, and the like. The electrical conductivity (EC) of the polishing composition can be measured by the method described in the Examples.

<Dispersing Medium>

In some embodiments, the polishing composition according to the present invention preferably further includes a dispersing medium. Examples of the dispersing medium include water; alcohols such as methanol, ethanol, ethylene glycol, and propylene glycol; ketones such as acetone; and mixtures thereof. Among these, water is preferred as the dispersing medium. That is, according to a more preferred mode of the present invention, the dispersing medium contains water. According to a further preferred mode of the present invention, the dispersing medium consists essentially of water. As described above, "essentially" intends that a dispersing medium other than water may be contained as long as the intended effect of the present invention can be achieved. More specifically, the dispersing medium consists of preferably 90% by mass or more and 100% by mass or less of water and 0% by mass or more and 10% by mass or less of a dispersing medium other than water, more preferably 99% by mass or more and 100% by mass or less of water and 0% by mass or more and 1% by mass or less of a dispersing medium other than water, and most preferably the dispersing medium is water.

From the viewpoint of not inhibiting the action of the components included in the polishing composition, water containing as few impurities as possible is preferred as the dispersing medium. Specifically, pure water or ultrapure water from which impurity ions have been removed with an ion exchange resin and then filtered to remove foreign substances, or distilled water, are more preferred.

[Other Components]

The polishing composition according to the present invention may further contain known additives that can be used in polishing compositions within a range that does not impair the effects of the present invention, such as oxidizing agents, water-soluble polymers, dihydric alcohols with a molecular weight of less than 20000, anionic copolymers, heterocyclic compounds having two or more nitrogen atoms in the ring, organic compounds having an active site and a suppressing site, step improvers, surfactants, anionic cyclic compounds, polyorganosiloxanes having a hydrophilic group, amino acids, inorganic acid salts or organic acid salts, complexing agents, antifungal agents (antiseptic agents), and the like.

<Oxidizing Agent>

The oxidizing agent has the function of facilitating polishing by oxidizing the metal to form an oxide film. Specific examples include hydrogen peroxide, metal oxides, peroxides, nitrates, iodates, periodates, hypochlorites, chlorites, chlorates, perchlorates, persulfates, dichromates, permanganates, organic oxidizing agents, ozonated water, silver (II) salts, iron (III) salts, and the like. These oxidizing agents can be used alone or in combination of two or more.

However, according to a preferred embodiment of the present invention, the polishing composition is substantially free of an oxidizing agent. According to this embodiment, when the object to be polished including a silicon oxide film and a silicon nitride film is polished, the silicon oxide film and the silicon nitride film can be polished at a high polishing removal rate. As used herein, "substantially free of" includes not only the concept that an oxidizing agent is not included at all in the polishing composition, but also cases where an oxidizing agent is included in the polishing composition at a concentration (content) of 0.1% by mass or less.

<Water-Soluble Polymer>

In some embodiments, the polishing composition according to the present invention may include a water-soluble polymer. Water-soluble polymers that can be used in the present invention are now described below.

(Anionic Water-Soluble Polymer (B))

In some embodiments, the water-soluble polymer may include an anionic water-soluble polymer shown below (hereinafter also simply referred to as "anionic water-soluble polymer (B)").

Examples of the anionic group of the anionic water-soluble polymer (B) include a carboxylic acid group (carboxy group), a sulfonic acid group, a sulfuric acid ester group, a phosphoric acid ester group, and a phosphonic acid group. From the viewpoint of reducing scratches and particles, those having a carboxylic acid group or a sulfonic acid group are preferred, and those having only a carboxylic acid group are more preferred. That is, the anionic water-soluble polymer (B) is preferably a polycarboxylic acid or a polysulfonic acid. These anionic groups may be in the form of a neutralized salt.

Examples of water-soluble polymers having a carboxylic acid group include (co) polymers having a structural unit derived from a monomer having a carboxylic acid group or a salt thereof. Examples of the monomer having a carboxylic acid group include itaconic acid, (meth)acrylic acid, maleic acid, and the like. The anionic water-soluble polymer may contain two or more types of structural units derived from monomers having carboxylic acid groups. Among these, preferred examples of the anionic water-soluble polymer (B) include poly(meth)acrylic acid and a (meth)acrylic acid-maleic acid copolymer.

Examples of water-soluble polymers having a sulfonic polyvinylsulfonic acid, acid group include polystyrenesulfonic acid, polyallylsulfonic acid, polyethyl acrylate sulfonic acid, polybutyl acrylate sulfonic acid, poly(2-acrylamido-2-methylpropanesulfonic acid), polyisoprene sulfonic acid, salts of these acids, and the like.

The anionic water-soluble polymer (B) may contain structural unit components derived from monomers other than the anionic group-containing monomer within a range that achieves the effects of the present invention.

The concentration (content) of the anionic water-soluble polymer in the polishing composition is preferably 1 mass ppm or more, more preferably 10 mass ppm or more, further preferably 100 mass ppm or more, still further preferably 1000 mass ppm or more, and particularly preferably 2000 mass ppm or more. Further, the concentration (content) f the anionic water-soluble polymer (B) in the polishing composition is preferably 100000 mass ppm or less, more preferably 10000 mass ppm or less, further preferably 8000 mass ppm or less, still further preferably 6000 mass ppm or less, and particularly preferably 4000 mass ppm or less. As the concentration (content) of the anionic water-soluble polymer (B) decreases, agglomeration of the abrasive grains in the polishing composition is less likely to occur. Therefore, there is an favorable effect of improving the storage stability of the polishing composition.

The weight average molecular weight (Mw) of the anionic water-soluble polymer (B) is preferably 1000 or more, more preferably 1500 or more, further preferably 2000 or more, still further preferably 3000 or more, even still further preferably 4000 or more, and particularly preferably 4500 or more. Further, the weight average molecular weight (Mw) of the anionic water-soluble polymer (B) is preferably 10000 or less, more preferably 6000 or less, further preferably 5500 or less, still further preferably 5400 or less, and particularly preferably 5300 or less. As the molecular weight of the anionic water-soluble polymer (B) decreases, agglomeration of the abrasive grains in the polishing composition is less likely to occur. Therefore, there is an favorable effect of improving the storage stability of the polishing composition. The weight average molecular weight of the anionic water-soluble polymer (B) is the value of the weight average molecular weight (in terms of polyethylene glycol) measured by gel permeation chromatography (GPC).

(Polyoxyalkylene Group-Containing Compound)

In some embodiments, the water-soluble polymer may be a polyoxyalkylene group-containing compound. The polyoxyalkylene group-containing compound is an organic compound containing a polyoxyalkylene group. The polyoxyalkylene group-containing compound may be a compound obtained by substituting or polymerizing some of the functional groups of a polyoxyalkylene group-containing compound. These may be used alone or in combination of two or more.

Specific examples of the polyoxyalkylene group include a polyoxyethylene group or a polyoxypropylene group; a polyoxyalkylene group in which an oxyethylene group and an oxypropylene group are block or randomly bonded; a group in which a polyoxyethylene group, a polyoxypropylene group, or a polyoxyalkylene group further contains a polyoxybutylene group through a block or random bond; and the like.

Specific examples of compounds in which the end of the polyoxyalkylene group is a hydroxy group include polyalkylene glycol derivatives such as polyethylene glycol, polypropylene glycol, and polybutylene glycol in various addition amounts, block types represented by the Plonon (registered trademark) series, such as Plonon (registered trademark) 102 and Plonon (registered trademark) 201 (both of which are manufactured by NOF Corporation), bisphenol A derivatives such as Uniol (registered trademark) DA-400, Uniol (registered trademark) DB-400, and Uniol (registered trademark) DB-530 (all of which are manufactured by NOF Corporation), and the like.

Specific examples of compounds in which the end of the polyoxyalkylene group is an ether group include various polyalkylene glycol alkyl ethers such as polyethylene glycol oleyl ether and polyethylene glycol dimethyl ether.

Specific examples of compounds in which the end of the polyoxyalkylene group is an ester group include polyalkylene glycol alkyl esters such as polyethylene glycol monooctyl ester, polypropylene glycol monostearyl ester, polypropylene glycol distearyl ester, and the like.

Specific examples of compounds in which the end of the polyoxyalkylene group is an allyl group include various polyalkylene glycol allyl ethers such as Uniox (registered trademark) PKA-5006, Uniol (registered trademark) PKA-5014, and Uniol (registered trademark) PKA-5017 (all of which are manufactured by NOF Corporation).

Specific examples of compounds in which the end of the polyoxyalkylene group is a (meth)acrylic group include polyalkylene glycol (meth)acrylates such as the Blemmar (registered trademark) PP series, the Blemmar (registered trademark) PME series, and the Blemmar (registered trademark) PDE series (all of which are manufactured by NOF Corporation).

Among these, the polyoxyalkylene group-containing compound is preferably at least one selected from the group consisting of polyethylene glycol, polypropylene glycol, and polybutylene glycol, and more preferably is polyethylene glycol.

The weight average molecular weight (in terms of polyethylene glycol) by GPC the measured of polyoxyalkylene group-containing compound is preferably 100 or more and 1000000 or less, more preferably 100 or more and 20000 or less, further preferably 100 or more and 5000 or less, and particularly preferably 100 or more and 2000 or less.

When the molecular weight distribution has two peaks, the weight average molecular weight of the peak having the smaller weight average molecular weight is preferably 100 or more and 2000 or less, and more preferably 100 or more and 1000 or less. Meanwhile, the weight average molecular weight of the peak having the larger weight average molecular weight is preferably 300 or more and 1000000 or less, and more preferably 300 or more and 100000 or less.

When the molecular weight distribution has three or more peaks, among any two peak molecular weights selected from the three or more peaks, the weight average molecular weight of the peak having the smaller weight average molecular weight is preferably 100 or more and 2000 or less, and more preferably 100 or more and 1000 or less. Further, among any two peak molecular weights selected from the three or more peaks, the weight average molecular weight of the peak having the larger weight average molecular weight is preferably 300 or more and 1000000 or less, and more preferably is 300 or more and 100000 or less.

The lower limit of the concentration (content) of the polyoxyalkylene group-containing compound in the polishing composition is preferably 0.0001% by mass or more, more preferably 0.0005% by mass or more, and further preferably 0.001% by mass or more. Further, the upper limit of the concentration (content) of the polyoxyalkylene group-containing compound in the polishing composition is preferably 30% by mass or less, more preferably 25% by mass or less, and further preferably 20% by mass or less. Within this range, the effects of the present invention can be thoroughly exhibited.

(Wetting Agent)

In some embodiments, the polishing composition according to the present invention may include a wetting agent. The "wetting agent" is adsorbed onto the surface of the object to be polished, and has an effect of changing the wettability of the surface from hydrophobic to hydrophilic. The wetting agent to be used is not particularly limited as long as it has the above effect, but for example, a water-soluble polymer having at least one functional group selected from a nonionic group, an anionic group, and a cationic group in the molecule can be used. Examples of the wetting agent include water-soluble polymers containing a hydroxy group, a carboxy group, an acyloxy group, a sulfo group, a quaternary ammonium structure, a heterocyclic structure, a vinyl structure, a polyoxyalkylene structure, and the like in the molecule. Specifically, examples of the wetting agent include vinyl alcohol polymers such as polyvinyl alcohol and derivatives thereof, starch derivatives, cellulose derivatives, polymers containing an N-(meth)acryloyl type monomer unit, polycarboxylic acids and derivatives thereof, polymers containing an oxyalkylene unit, polymers containing an N-vinyl type monomer unit, imine derivatives, and the like. Among these, water-soluble polymers that are adsorbed onto the surface of a material having a silicon-silicon bond with a hydrophilic group such as —OH, —COOH, and $—NH_2$ facing the liquid side are preferred.

Suitable examples of the wetting agent include nonionic water-soluble polymers such as polyvinyl alcohol (PVA), polyvinylpyrrolidone (PVP), pullulan, and hydroxyethyl cellulose; anionic water-soluble polymers such as polyacrylic acid and carboxymethyl cellulose; cationic water-soluble polymers such as polyacrylamide, and the like.

The wetting agent can be used alone or in combination of two or more.

In a preferred embodiment of the present invention, the wetting agent is at least one selected from the group consisting of polyvinyl alcohol, polyvinylpyrrolidone, pullulan, hydroxyethyl cellulose, polyacrylic acid, carboxymethyl cellulose, and polyacrylamide.

From the viewpoint of being able to suppress agglomeration of the abrasive grains according to the present invention, the wetting agent is preferably a nonionic water-soluble polymer.

Therefore, in a more preferred embodiment of the present invention, the wetting agent is at least one selected from the group consisting of polyvinyl alcohol, polyvinylpyrrolidone, pullulan, and hydroxyethyl cellulose. In a further preferred embodiment of the present invention, the wetting agent is polyvinyl alcohol.

The lower limit of the weight average molecular weight of the wetting agent is preferably 1,000 or more, more preferably 2,000 or more, and further preferably 3,000 or more, because the more functional groups that are adsorbed onto the substrate (the object to be polished), the stronger the obtained adsorbed film becomes. The upper limit of the weight average molecular weight of the wetting agent is preferably 300,000 or less, more preferably 200,000 or less, and further preferably 150,000 or less, because the wetting agent needs to be uniformly adsorbed onto the substrate (the object to be polished). The weight average molecular weight of the wetting agent can be measured by, for example, the GPC method.

From the viewpoint of improving the wettability of the substrate (the object to be polished), the lower limit of the concentration (content) of the wetting agent in the polishing composition is preferably 0.1 g/kg or more, and more preferably 1.5 g/kg or more. From the viewpoint of reduction in the polishing removal rate due to a a reduction in frictional force, the upper limit of the concentration (content) of the wetting agent in the polishing composition is preferably 5.0 g/kg or less, and more preferably 3.0 g/kg or less.

<Anionic Copolymer>

According to some embodiments, the polishing composition according to the present invention may include the anionic copolymer shown below. The anionic copolymer has two or more types of acidic groups with different acidities, preferably two types of acidic groups with different acidities, and more preferably has both an acidic group with a high acid dissociation constant relative to the pH of the polishing composition and an acidic group with a low acid dissociation constant relative to the pH of the polishing composition. If the anionic copolymer has two or more types of acidic groups with different acidities, all of the unit structures of the anionic copolymer may be represented by only either the following formula (1) or the following formula (2), or the anionic copolymer may have both a unit structure represented by the following formula (1) and a unit structure represented by the following formula (2). X in the following formula (1) and Y in the following formula (2) may be acidic groups with the same structure. Further, the anionic copolymer may have three or more types of unit structures.

By containing an anionic copolymer, the polishing composition according to the present invention has an action of highly selectively scraping away protruding asperities on the surface of an object to be polished, such as silicon nitride, whose surface is positively charged at a pH of less than 6. For example, according to a preferred embodiment of the present invention, a polishing method, or a method for producing a semiconductor substrate, having a step of polishing the protruding portions on the surface of an object to be polished whose surface is positively charged at a pH of less than 6 at a polishing removal rate that is at least 10 times greater than that of recessed portions can be provided.

The anionic copolymer may be a copolymer of two or more types of monomers having an acidic group, or may be a copolymer obtained by copolymerizing two or more types of monomers having a functional group that can be converted into an acidic group so that those functional groups have been converted into acidic groups. The copolymer may be any of a random copolymer, an alternating copolymer, a block copolymer, or a graft copolymer, but is preferably a block copolymer in which the types of acidic groups are unevenly distributed.

The anionic copolymer is not particularly limited as long as it has a unit structure represented by the following formula (1) or a unit structure represented by the following formula (2). The anionic copolymer may be a vinyl copolymer or a condensation copolymer. The anionic copolymer may be a commercially available product, or may be obtained by introducing an acidic group into a commercially available resin.

[Formula 1]

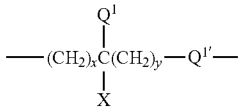

(1)

In formula (1), $Q^1$ is a hydrogen atom; an alkyl group having 1 or more and 6 or less carbon atoms that is selected from the group consisting of a methyl group, an ethyl group, a n-propyl group, an isopropyl group, a n-butyl group, a sec-butyl group, a tert-butyl group, a n-pentyl group, and a n-hexyl group; or an alkoxy group having 1 or more and 6 or less carbon atoms that is selected from the group consisting of a methoxy group, an ethoxy group, a n-propoxy group, an isopropoxy group, a n-butoxy group, a sec-butoxy group, a tert-butoxy group, a n-pentoxy group, and a n-hexoxy group, $Q^{1'}$ is a single bond, an ether bond, an ester bond, an amide bond, or a carbonyl bond, x is an integer from 0 to 10, y is an integer from 0 to 10, and X is an acidic group selected from a sulfonic acid group, a carboxyl group, a hydroxyl group, or a phosphoric acid group, or an aliphatic hydrocarbon group having 1 or more and 10 or less carbon atoms that has at least one of these acidic groups, or an aromatic hydrocarbon group having 6 or more and 12 or less carbon atoms that has at least one of these acidic groups.

[Formula 2]

$$-(CH_2)_x\underset{\underset{Y}{|}}{Ar}(CH_2)_y-Q^2- \qquad (2)$$

In formula (2), Ar is a substituted or unsubstituted aromatic group having 6 or more and 12 or less carbon atoms. When Ar is a substituted aromatic group, the substituent is, for example, an alkyl group having 1 or more and 6 or less carbon atoms that is selected from the group consisting of a methyl group, an ethyl group, a n-propyl group, an isopropyl group, a n-butyl group, a sec-butyl group, a tert-butyl group, a n-pentyl group, and a n-hexyl group; or an alkoxy group having 1 or more and 6 or less carbon atoms that is selected from the group consisting of a methoxy group, an ethoxy group, a n-propoxy group, an isopropoxy group, a n-butoxy group, a sec-butoxy group, a tert-butoxy group, a n-pentoxy group, and a n-hexoxy group.

In formula (2), $Q^2$ is a single bond, an ether bond, an ester bond, an amide bond, or a carbonyl bond, x is an integer from 0 to 10, y is an integer from 0 to 10, and Y is an acidic group selected from a sulfonic acid group, a carboxyl group, a hydroxyl group, or a phosphoric acid group, or an aliphatic hydrocarbon group having 1 or more and 10 or less carbon atoms that has at least one of these acidic groups, or an aromatic hydrocarbon group having 6 or more and 12 or less carbon atoms that has at least one of these acidic groups.

A single bond refers to a bond that shares one pair of shared electrons, and so when $Q^{1'}$ or $Q^2$ represents a single bond, this means that $Q^{1'}$ or $Q^2$ does not include an atom such as a carbon atom, and that the atoms on both sides of $Q^{1'}$ or $Q^2$ are bonded to each other by a single bond.

In the anionic copolymer, the acidic groups exhibiting mutually different acidities or the substituents to which the acidic groups are bonded may have the same or different structures. A preferred combination of different acidic groups includes a combination of a sulfonic acid group and a carboxyl group. Further, in the case where the acidic groups or the substituents to which the acidic groups are bonded are the same, the difference in acidity may be expressed by having different main chain structures. For example, in the case of a copolymer of acrylic acid and fumaric acid, the copolymer is composed of a unit structure represented by —CH(COOH)— and a unit structure represented by $—CH_2CH(COOH)—$. In this case, in the former unit structure, because the acidic group is bonded to an adjacent carbon, the negative charge remaining after the proton is removed is stabilized by the adjacent acidic group, and the removal of the proton from the acidic group is promoted. Therefore, even when using anionic copolymers in which acidic groups with different acidities or substituents to which the acidic groups are bonded have the same structure, it is considered that the asperities (steps) of the silicon nitride film can be eliminated.

From the viewpoint of a protective effect, the weight average molecular weight of the anionic copolymer is preferably 500 or more, and more preferably 1000 or more. Further, from the viewpoint of dispersibility, the weight average molecular weight is preferably 100000 or less, and more preferably 50000 or less. The weight average molecular weight can be measured by the GPC method.

The concentration (content) of the anionic copolymer in the polishing composition according to the present invention can be appropriately adjusted based on the concentration (content) of abrasive grains and the object to be polished. The concentration (content) of the anionic copolymer is not particularly limited, but may be in a range of 0.1 mass ppm or more and 100000 mass ppm or less. Within this range, the object to be polished such as silicon nitride can be planarized at a sufficient polishing removal rate.

It is preferred that the acid dissociation constant (pKa) of at least one kind of the acidic groups having different acidity levels in the anionic copolymer is smaller than the pH of the polishing composition. By setting the acid dissociation constant (pKa) of at least one type of acidic group to be small relative to the pH of the polishing composition, the anionic copolymer tends to be ionized and adsorbed onto the object to be polished. As a result, it is possible to suppress the recessed portions from being scraped off by the abrasive grains.

<Heterocyclic Compound Having Two or More Nitrogen Atoms in the Ring>

The heterocyclic compound having two or more nitrogen atoms in the ring contributes to improving the polishing removal rate of the object to be polished. In particular, such a heterocyclic compound is effective in improving the polishing removal rate of silicon nitride. When the object to be polished contains silicon nitride, it is thought that when the heterocyclic compound approaches the silicon nitride, the covalent bonds of the silicon nitride are stretched and the bond strength is weakened, thereby improving the polishing removal rate. It is also noted that the heterocyclic compound containing two or more nitrogen atoms in the ring functions as an anticorrosive agent in the polishing composition.

Examples of the heterocyclic compound containing two or more nitrogen atoms in the ring include imidazole derivatives, pyrazole derivatives, triazole derivatives, tetrazole derivatives, pentazole derivatives, pyrazine derivatives, pyridazine derivatives, quinoxaline derivatives, and the like. The number of ring members of this heterocyclic compound is not particularly limited, and for example, the number of ring members may be 5 or more and 14 or less. In one embodiment, the heterocyclic compound containing two or more nitrogen atoms in the ring is a 5-membered ring compound. In addition, if the ring contains two or more nitrogen atoms, the heterocyclic compound may contain a substituent such as an amino group, an amide group, a phenyl group, a methyl group, a carboxy group, a phosphoric acid group, a sulfo group, a thiol group (mercapto group), a nitro group, a cyclohexyl group or a hydroxy group.

Specific examples of the imidazole derivatives include imidazole, 2-methylimidazole, 1,2-dimethylimidazole, 2-ethyl-4-methylimidazole, 2-isopropylimidazole, benzimidazole, 2-aminobenzimidazole, and the like.

Specific examples of the pyrazole derivatives include pyrazole, 3,5-pyrazoledicarboxylic acid hydrate, 3-amino-5-phenylpyrazole, 3,5-dimethylpyrazole, 1-methylpyrazole, 3-amino-5-methylpyrazole, and the like.

Specific examples of the triazole derivatives include 1,2,3-triazole, 1,2,4-triazole, 1-methyl-1,2,4-triazole, and the like.

Specific examples of the tetrazole derivatives include 1H-tetrazole, 5,5'-bistetrazole diammonium, 5-amino-1H-tetrazole, 5-phenyl-1H-tetrazole, 5-methyl-1H-tetrazole, and the like.

These heterocyclic compounds containing two or more nitrogen atoms in the ring may be used alone or in combination of two or more.

Among these heterocyclic compounds, more preferred are imidazole, 1,2-dimethylimidazole, 2-methylimidazole, 2-aminobenzimidazole, pyrazole, 1-methylpyrazole, 3,5-dimethylpyrazole, 3,5-pyrazoledicarboxylic acid hydrate, 3-amino-5-methylpyrazole, 1H-tetrazole, 5-amino-1H-tetrazole, 5-phenyl-1H-tetrazole, and 5,5'-bistetrazole diammonium.

The concentration (content) of the heterocyclic compound containing two or more nitrogen atoms in the ring in the polishing composition is, relative to the total mass of the polishing composition, preferably 0.01% by mass or more, more preferably 0.05% by mass or more, and further preferably 0.1% by mass or more. Within this range, the polishing removal rate of the object to be polished improves. Further, the concentration (content) of the heterocyclic compound containing two or more nitrogen atoms in the ring in the polishing composition is, relative to the total mass of the polishing composition, preferably 1.0% by mass or less, more preferably 0.8% by mass or less, and further preferably 0.5% by mass or less. Within this range, the cost of the polishing composition can be suppressed.

<Step Improver>

In some embodiments, the polishing composition according to the present invention may include a step improver to reduce steps that unintentionally occur between different materials or that unintentionally occur between dense portions of a pattern.

The step improver is preferably at least one selected from the group consisting of a compound represented by the following formula (3) or a salt thereof, a compound represented by the following formula (4) or a salt thereof, a polymer composed of a structural unit represented by the following formula (5) or a salt thereof, and a copolymer or a salt thereof having a structural unit represented by the following formula (5) and a structural unit derived from another monomer.

[Formula 3]

(3)

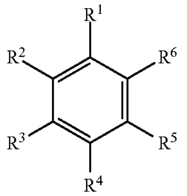

In formula (3), $R^1$ to $R^6$ are each independently a hydrogen atom, a hydroxy group, a sulfo group, an anionic group not containing a sulfo group, a cationic group, an alkoxycarbonyl group having 2 or more and 6 or less carbon atoms, or a hydrocarbon group having 1 or more and 10 or less carbon atoms, wherein at least one of $R^1$ to $R^6$ is a sulfo group;

[Formula 4]

(4)

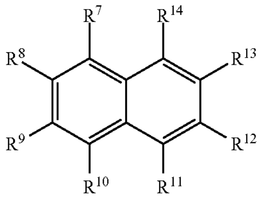

in formula (4), $R^7$ to $R^{14}$ are each independently a hydrogen atom, a hydroxy group, a sulfo group, an anionic group not containing a sulfo group, a cationic group, an alkoxycarbonyl group having 2 or more and 6 or less carbon atoms, or a hydrocarbon group having 1 or more and 10 or less carbon atoms, wherein at least one of $R^7$ to $R^{14}$ is a sulfo group;

[Formula 5]

(5)

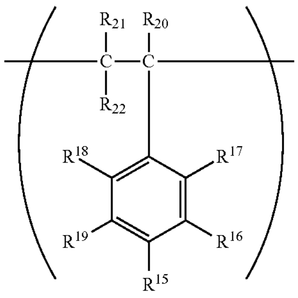

in formula (5), $R^{15}$ to $R^{19}$ are each independently a hydrogen atom, a hydroxy group, a sulfo group, an anionic group not containing a sulfo group, a cationic group, an alkoxycarbonyl group having 2 or more and 6 or less carbon atoms, or a hydrocarbon group having 1 or more and 10 or less carbon atoms, wherein at least one of $R^{15}$ to $R^{19}$ is a sulfo group; and $R^{20}$ to $R^{22}$ are each independently a hydrogen atom, a hydroxy group, an anionic group not containing a sulfo group, a cationic group, or an alkoxycarbonyl group having 2 or more and 6 or less carbon atoms, or is a hydrocarbon group having 1 or more and 10 or less carbon atoms that is substituted with a hydroxy group, an anionic group not containing a sulfo group, a cationic group, or an alkoxycarbonyl group having 2 or more and 6 or less carbon atoms, or is unsubstituted.

The step improver according to the present invention may be, at the time of mixing, the compound represented by formula (3) or a salt thereof, the compound represented by formula (4) or a salt thereof, the polymer composed of a structural unit represented by formula (5) or a salt thereof, or the copolymer or a salt thereof having a structural unit represented by formula (5) and a structural unit derived from another monomer, in that state or in as a hydrate thereof.

The step improver is preferably m-xylene sulfonic acid or a salt thereof, p-toluidine-2-sulfonic acid or a salt thereof, 2-naphthol-6-sulfonic acid or a salt thereof, 1-naphthalene sulfonic acid or a salt thereof, or a parastyrene sulfonic acid-styrene copolymer or a salt thereof, more preferably m-xylene sulfonic acid, p-toluidine-2-sulfonic acid, sodium 2-naphthol-6-sulfonate, 1-naphthalene sulfonic acid, or a parastyrene sulfonic acid-styrene copolymer or a salt thereof, and further preferably a parastyrene sulfonic acid-styrene copolymer or a salt thereof.

When using a combination of two or more step improvers, it is more preferable to use p-toluidine-2-sulfonic acid and a para-styrene sulfonic acid-styrene copolymer or a salt thereof in combination.

Further, among the polymer composed of a structural unit represented by formula (5) or a salt thereof, or the copolymer having a structural unit represented by formula (5) and a structural unit derived from another monomer or a salt thereof, from the viewpoint of better exhibiting the effects of the present invention, the copolymer having a structural unit represented by formula (5) and a structural unit derived from another monomer or a salt thereof is more preferred.

In the copolymer having a structural unit represented by formula (5) and a structural unit derived from another monomer or a salt thereof, the lower limit of the content ratio of the structural unit represented by formula (5) relative to the total number of moles of the structural unit represented by formula (5) and the structural unit derived from another monomer is preferably 1 mol % or more, more preferably 5 mol % or more, further preferably 10 mol % or more, and particularly preferably 30 mol % or more. Further, the upper limit of the content ratio of the structural unit represented by formula (5) relative to the total number of moles of the structural unit represented by formula (5) and the structural unit derived from another monomer is 99 mol % or less, more preferably 95 mol % or less, further preferably 90 mol % or less, and particularly preferably 70 mol % or less. Within this range, the effects of the present invention can be better exhibited.

The lower limit of the weight average molecular weight of the polymer composed of a structural unit represented by formula (5) or a salt thereof, or the copolymer having a structural unit represented by formula (5) and a structural unit derived from another monomer or a salt thereof is preferably 1000 or more, more preferably 2000 or more, further preferably 3000 or more, and particularly preferably 10000 or more. In addition, the upper limit of the weight average molecular weight of the polymer composed of a structural unit represented by formula (5) or a salt thereof, or the copolymer having a structural unit represented by formula (5) and a structural unit derived from another monomer or a salt thereof is preferably 1000000 or less, more preferably 100000 or less, further preferably 50000 or less, and particularly preferably 30000 or less. Within this range, the effects of the present invention can be better exhibited.

The weight average molecular weight of the polymer composed of a structural unit represented by formula (5) or a salt thereof, or the copolymer having a structural unit represented by formula (5) and a structural unit derived from another monomer or a salt thereof can be measured by the GPC method.

When the step improver is a salt, a part or all of the sulfo groups or other functional groups capable of forming a salt may be a salt. Examples of the salt include alkali metal salts such as sodium salts and potassium salts, salts of Group 2 elements such as calcium salts and magnesium salts, amine salts, ammonium salts, and the like. Among these, sodium salts are particularly preferred.

The lower limit of the concentration (content) of the step improver in the polishing composition is preferably 0.0001 g/L or more, and more preferably 0.001 g/L or more. Further, the upper limit of the concentration (content) of the step improver in the polishing composition is preferably 100 g/L or less, and more preferably 5 g/L or less. Within this range, the effects of the present invention can be better exhibited. A polishing composition according to a preferred embodiment of the present invention includes, for example, a polishing composition containing a step improver in an amount of 0.001 g/L or more and 5 g/L or less.

The lower limit of the concentration (content) of the step improver that is the compound represented by formula (3) or a salt thereof or the compound represented by formula (4) or a salt thereof in the polishing composition is more preferably 0.01 g/L or more, particularly preferably 0.1 g/L or more, and most preferably 0.6 g/L or more. In addition, the upper limit of the concentration (content) of the step improver that is the compound represented by formula (3) or a salt thereof or the compound represented by formula (4) or a salt thereof in the polishing composition is more preferably 4 g/L or less. Within this range, the effects of the present invention can be exhibited very well.

The lower limit of the concentration (content) of the polymer composed of a structural unit represented by formula (5) or a salt thereof or the copolymer having a structural unit represented by formula (5) and a structural unit derived from another monomer or a salt thereof in the polishing composition is more preferably 0.005 g/L or more. In addition, the upper limit of the concentration (content) of the polymer composed of a structural unit represented by formula (5) or a salt thereof or the copolymer having a structural unit represented by formula (5) and a structural unit derived from another monomer or a salt thereof in the polishing composition is more preferably 0.1 g/L or less, and particularly preferably 0.05 g/L or less. Within this range, the effects of the present invention can be exhibited very well.

In a case where the step improver is mixed as a hydrate when the step improver is mixed during the production of the polishing composition, the concentration (content) of the step improver in the above preferred polishing compositions represents the concentration (content) calculated by excluding the water of the hydrate from the mass.

<Surfactant>

The polishing composition according to the present invention may further include a surfactant. The surfactant may have an effect of further improving the polishing removal rate of a specific object to be polished, or an effect of reducing residue on the surface of a polished object to be polished.

The surfactant is not particularly limited, and any of an anionic surfactant, a nonionic surfactant, a cationic surfactant, and an amphoteric surfactant can be used. The surfactant can be used alone or in combination of two or more.

Specific examples of the anionic surfactant include polyoxyethylene alkyl ether acetate, polyoxyethylene alkyl sulfate, alkyl sulfate, polyoxyethylene alkyl sulfonate, alkyl sulfonate, alkylbenzene sulfonate, alkyl phosphate, polyoxyethylene sulfosuccinate, alkyl sulfosuccinate, alkyl naphthalene sulfonate, alkyldiphenyl ether disulfonate, polyacrylic acid, sodium lauryl sulfate, ammonium lauryl sulfate, sodium dodecylbenzene sulfonate, sodium polyoxyethylene alkyl ether sulfate, ammonium polyoxyethylene alkylphenyl ether sulfate, sodium polyoxyethylene alkyl phenyl ether sulfate, and the like.

Other specific examples of the anionic surfactant include polyalkylaryl sulfonic acid compounds such as a naphthalene sulfonic acid formaldehyde condensate, a methylnaphthalene sulfonic acid formaldehyde condensate, an anthracene sulfonic acid formaldehyde condensate, and a benzenesulfonic acid formaldehyde condensate; melamine-formalin resin sulfonic acid compounds such as a melamine sulfonic acid formaldehyde condensate; lignosulfonic acid compounds such as a lignosulfonic acid and a modified lignosulfonic acid; aromatic amino sulfonic acid compounds such as an amino aryl sulfonic acid-phenol-formaldehyde condensate, and the like. As the salt, alkali metal salts such as sodium salts and potassium salts are preferred.

Specific examples of the nonionic surfactant include polyoxyethylene alkyl ethers, polyoxyalkylene alkyl ethers, sorbitan fatty acid esters, glycerin fatty acid esters, polyoxyethylene fatty acid esters, polyoxyethylene alkylamines, alkyl alkanolamides, and the like.

Specific examples of cationic surfactant include alkyltrimethylammonium salts, alkyldimethylammonium salts, alkylbenzyldimethylammonium salts, alkylamine salts, and the like.

Specific examples of the amphoteric surfactant include alkyl betaines, alkyl amine oxides, and the like.

The surfactant may be a compound shown in (i), (ii), or (iii) below.

(i) According to some embodiments, the surfactant may be a compound represented by the following formula (6) or the following formula (7).

[Formula 6]

(6)

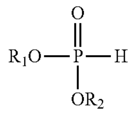

[Formula 7]

(7)

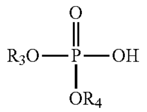

In the above formulas (6) and (7), $R_1$, $R_2$, $R_3$, and $R_4$ are each independently a substituted or unsubstituted alkyl group having 1 or more and 20 or less carbon atoms, or a substituted or unsubstituted aryl group having 6 or more and 20 or less carbon atoms.

In some embodiments, the number of carbon atoms in the alkyl group is preferably 2 or more and 15 or less, more preferably 2 or more and 14 or less, and further preferably 2 or more and 13 or less. According to such an embodiment, the polishing removal rate can be further improved.

Specific examples of the alkyl group having 1 or more and 20 or less carbon atoms are not particularly limited, and include, for example, a methyl group, an ethyl group, a propyl group, an isopropyl group, a n-butyl group, an isobutyl group, a sec-butyl group, a tert-butyl group, a pentyl group, an isopentyl group, a neopentyl group, a 2-ethylhexyl group, a hexyl group, a heptyl group, an octyl group, a nonyl group, a decyl group, an undecyl group, a dodecyl group (lauryl group), a tridecyl group, a tetradecyl group (myristyl group), a pentadecyl group, a hexadecyl group (palmityl group), a heptadecyl group, an octadecyl group (stearyl group), a nonadecyl group, an icosyl group, and the like.

When $R_1$, $R_2$, $R_3$, and $R_4$ are unsubstituted alkyl groups having 1 or more and 20 or less carbon atoms, the number of carbon atoms in the alkyl group is more preferably 3 or more and 14 or less, and further preferably 4 or more and 13 or less. By setting in such a range, the polishing removal rate can be further improved.

When $R_1$, $R_2$, $R_3$, and $R_4$ are substituted alkyl groups having 1 or more and 20 or less carbon atoms, the substituent is preferably an alkoxy group having 1 or more and 10 or less carbon atoms or an aryl group having 6 or more and 20 or less carbon atoms. According to this embodiment, polishing removal rate can be further improved.

From the viewpoint of more effectively improving the polishing removal rate, the number of carbon atoms in the alkoxy group is preferably 2 or more and 8 or less, more preferably 3 or more and 6 or less, and further preferably 4 or more and 6 or less. Specific examples of the aryl group include a phenyl group, a naphthyl group, an anthracenyl group (anthryl group), and the like. Thus, when the substituent is an alkoxy group, an aryl group, or the like, the number of carbon atoms in the alkyl group is preferably 1 or more and 4 or less, and more preferably 2 or more and 3 or less.

When $R_1$, $R_2$, $R_3$, and $R_4$ are substituted alkyl groups having 1 or more and 20 or less carbon atoms, for example, alkoxyalkyl groups such as a methoxymethyl group, an ethoxymethyl group, a propoxymethyl group, a methoxyethyl group, an ethoxyethyl group, a propoxyethyl group, an isopropoxyethyl group, a butoxyethyl group, a hexyloxyethyl group, a heptyloxyethyl group, an octyloxyethyl group, and a cyclohexyloxyethyl group, and aralkyl groups such as a benzyl group, a phenethyl group, a naphthylmethyl group, an anthrylmethyl group are preferred.

When $R_1$, $R_2$, $R_3$, and $R_4$ are unsubstituted aryl groups having 6 or more and 20 or less carbon atoms, the aryl groups listed above can be suitably applied.

When $R_1$, $R_2$, $R_3$, and $R_4$ are a substituted aryl groups having 6 or more and 20 or less carbon atoms, the substituent is preferably an alkyl group having 1 or more and 20 or less carbon atoms or an alkoxy group having 1 or more and 10 or less carbon atoms.

As specific description of the alkyl groups having 1 or more and 20 or less carbon atoms and the alkoxy groups having 1 or more and 10 or less carbon atoms, the above description can be similarly applied.

In some embodiments, when $R_1$, $R_2$, $R_3$, and $R_4$ are substituted aryl groups having 6 or more and 20 or less carbon atoms, for example, a tolyl group, a xylyl group, a mesityl group, a methylnaphthyl group, a methylanthryl group, a methoxyphenyl group, an ethoxyphenyl group, and the like are preferred.

In view of the above, according to a preferred embodiment of the present invention, the surfactant is at least one selected from the group consisting of bis(2-ethylhexyl) phosphate, dilauryl hydrogen phosphite, butyl acid phosphate, monobutoxyethyl acid phosphate, and diphenyl hydrogen phosphite.

(ii) According to some embodiments, the surfactant may be a compound represented by the following formula (8).

[Formula 8]

(8)

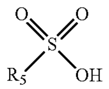

In formula (8), $R_5$ is a substituted or unsubstituted branched alkyl group having 3 or more and 20 or less carbon atoms, or is a group represented by the following formula.

$(OE)_nOR_6$ [Formula 9]

In this case, E is an alkylene group having 1 or more and 3 or less carbon atoms, $R_6$ is a substituted or unsubstituted branched alkyl group having 3 or more and 20 or less or an aryl group having a branched alkyl group having 3 or more and 20 or less carbon atoms, and n is 2 or more and 100 or less. A plurality of E's may be the same or different. Here, n is preferably 3 or more and 50 or less, and more preferably 4 or more and 25 or less.

The number of carbon atoms in the branched alkyl group is preferably 3 or more and 15 or less, more preferably 4 or more and 13 or less, further preferably 5 or more and 11 or less, still further preferably 6 or more and 10 or less, and particularly preferably 7 or more and 10 or less. According to this embodiment, the polishing removal rate can be further improved. The substituent in the substituted or unsubstituted branched alkyl group having 3 or more and 20 or less carbon atoms is not particularly limited, and examples include an alkoxy group having 1 or more and 10 or less carbon atoms, an aryl group having 6 or more and 20 or less carbon atoms, and the like.

Specific examples of the branched alkyl group having 3 or more and 20 or less carbon atoms are not particularly limited, and include, for example, an isopropyl group, an isobutyl group, a sec-butyl group, a tert-butyl group, an isopentyl group, a neopentyl group, a 2-ethylhexyl group, an isodecyl group, and the like. Among these, a 2-ethylhexyl group and an isodecyl group are preferred. According to some embodiments, examples of the alkylene group having 1 or more and 3 or less carbon atoms include a methylene group, an ethylene group, a propylene group, and a trimethylene group, with an ethylene group and a propylene group being preferred.

In the aryl group having a branched alkyl group having 3 or more and 20 or less carbon atoms, the branched alkyl group having 3 or more and 20 or less carbon atoms is preferably a group listed above, and examples of the aryl group include a phenyl group, a naphthyl group, and the like.

The compound represented by the above formula (8) may be in the form of a salt. There are no particular restrictions on the type of the salt, but sodium salts, potassium salts, ammonium salts, amine salts, and the like are preferred.

(iii) In some embodiments, the surfactant may be an anionic surfactant (hereinafter also referred to as "anionic surfactant (A)") having at least one acidic functional group selected from the group consisting of a sulfo group, a phosphoric acid group, and a phosphonic acid group, and a polyoxyalkylene group.

Examples of the anionic surfactant (A) having at least one acidic functional group selected from the group consisting of a sulfo group, a phosphoric acid group, and a phosphonic acid group, and a polyoxyalkylene group include compounds represented by the following formula (9), compounds represented by the following formula (10), and compounds represented by the following formula (11).

[Formula 10]

$$RO(C_yH_{2y}O)_zSO_3M \quad (9)$$

$$RO(C_yH_{2y}O)_zPO_3M_2 \quad (10)$$

$$\{RO(C_yH_{2y}O)_z\}_2PO_2M \quad (11)$$

In the above formulas (9) to (11), R each independently represents an optionally substituted aromatic hydrocarbon group or $C_xH_{2x+1}$ (x is an integer of 6 or more and 18 or less), y each independently represents an integer of 1 or more and 4 or less, z each independently represents an integer of 1 or more and 6 or less, and M each independently represents a hydrogen atom, an alkyl group, an alkali metal, or $NH_4$.

Examples of the aromatic hydrocarbon group include aryl groups such as a phenyl group, a tolyl group, a xylyl group, a naphthyl group, an anthryl group, and an arylphenyl group; aralkyl groups such as a benzyl group, a phenethyl group, and a naphthylmethyl group, and the like. Among these, an aryl group is preferred, and an arylphenyl group is more preferred.

The alkali metal is not particularly limited, but sodium is preferred from the viewpoint of ease of availability.

That is, the polyoxyalkylene group that the anionic surfactant (A) has may be bonded to at least one acidic functional group selected from the group consisting of a sulfo group, a phosphoric acid group, and a phosphonic acid group. Here, the above-mentioned "bond" refers to a state in which the polyoxyalkylene group and the acidic functional group are connected in a linear chain.

Further, the polyoxyalkylene group that the anionic surfactant (A) has may be at least one functional group selected from a polyoxymethylene group, a polyoxyethylene group, a polyoxypropylene group, and a polyoxybutylene group.

In addition, the number of repeating polyoxyalkylene groups that the anionic surfactant (A) has may be in the range of 1 or more and 6 or less. If the number of repeating polyoxyalkylene groups is 0, that is, when the anionic surfactant (A) does not have a polyoxyalkylene group, adsorption of the anionic surfactant to the abrasive grains and the object to be polished is low, and so the amount of residue on the object to be polished may not be reduced. If the number of repeating polyoxyalkylene groups is 7 or more, the viscosity of the anionic surfactant (A) may increase, making handling difficult.

The anionic surfactant (A) may be used alone or in combination of two or more.

Among the above anionic surfactants (A), polyoxyalkylene allyl phenyl ether sodium sulfate, polyoxyethylene alkyl (C10) ether phosphate, dipolyoxyethylene (10) sodium lauryl ether phosphate, and dipolyoxyethylene (2) sodium lauryl ether phosphate are preferred, and polyoxyalkylene allyl phenyl ether sodium sulfate (having an aromatic hydrocarbon group as R) is more preferred. Here, "C10" in "polyoxyethylene alkyl (C10) ether phosphate" means that the alkyl has 10 carbon atoms. Further, the "10" in "dipolyoxyethylene (10) sodium lauryl ether phosphate" means that the average repeating number of oxyethylene units in the polyoxyethylene group is ten. The same applies to "dipolyoxyethylene (2) sodium lauryl ether phosphate".

The weight average molecular weight of the anionic surfactant (A) is preferably in the range of 200 or more and 1000 or less. The weight average molecular weight of the anionic surfactant (A) can be measured by GPC method.

The lower limit of the concentration (content) of the surfactant in the polishing composition is preferably 1 mass ppm or more, more preferably 10 mass ppm or more, further preferably 80 mass ppm or more, and still further preferably 90 mass ppm or more. When the lower limit is like this, the effects of the present invention are more effectively exhibited.

Further, the upper limit of the concentration (content) of the surfactant in the polishing composition is preferably 10000 mass ppm or less, more preferably 1000 mass ppm or less, further preferably 500 mass ppm or less, and still further preferably 300 mass ppm or less. This upper limit is favorable from the viewpoint of cost and a reduction in the residue on the object to be polished.

<Anionic Cyclic Compound>

The polishing composition according to the present invention may include a compound having a ring structure and having three or more anionic functional groups bonded to the ring structure, or a salt thereof (hereinafter also simply referred to as "anionic cyclic compound").

Specific examples of the anionic cyclic compound include benzene derivatives such as trimellitic acid (1,2,4-benzenetricarboxylic acid), trimesic acid (1,3,5-benzenetricarboxylic acid), 4-sulfophthalic acid containing 3-sulfophthalic acid, pyromellitic acid (benzene-1,2,4,5-tetracarboxylic acid), and mellitic acid (benzenehexacarboxylic acid); naphthalene derivatives such as trisodium naphthalene-1,3,6-trisulfonic acid hydrate; cyclobutane derivatives such as 1,2,3,4-cyclobutanetetracarboxylic acid and trimethyl 1α,2α,3α-cyclobutanetricarboxylate; cyclopentane derivatives such as 1,2,3,4-cyclopentanetetracarboxylic acid and 2-carboxymethyl-1,3,4-cyclopentanetricarboxylic acid; cyclohexane derivatives such as 1,2,4,5-cyclohexanetetracarboxylic acid, 1,2,3,4,5,6-cyclohexanehexacarboxylic acid monohydrate, and phytic acid; cycloalkene derivatives such as cyclohexentricarboxylic acid; cyclodiene derivatives such as cyclohexadiene tricarboxylic acid; and the like.

Among these anionic cyclic compounds, more preferred are 4-sulfophthalic acid containing 3-sulfophthalic acid, pyromellitic acid, mellitic acid, phytic acid, 1,2,3,4-cyclobutanetetracarboxylic acid, 1,2,3,4-cyclopentanetetracarboxylic acid, 1,2,4,5-cyclohexanetetracarboxylic acid, or 1,2,3,4,5,6-cyclohexanehexacarboxylic acid monohydrate.

The concentration (content) of the anionic cyclic compound in the polishing composition is preferably 1 mmol/L or more and 100 mmol/L or less. Within this range, for example, silicon oxide, which is the object to be polished, can be polished at a higher polishing removal rate.

<Organopolysiloxane Having a Hydrophilic Group>

An organopolysiloxane having a hydrophilic group can improve the polishing removal rate of silicon nitride. The organopolysiloxane having a hydrophilic group can be used alone or in combination of two or more.

The organopolysiloxane having a hydrophilic group is preferably a hydrophilic group-modified silicone oil. Examples of the hydrophilic group include an amino group, an epoxy group, a carboxyl group, a carbinol group, an acryloyl group, an acryloyloxy group, a methacryloyl group, a methacryloyloxy group, a mercapto group, a phenol group, a polyoxyalkylene group (for example, a polyoxyethylene group, a polyoxypropylene oxide group, and the like), and the like. Further, the hydrophilic group can be, depending on its modifying position, classified into a both-end type, a one-end type, a side-chain type, and a side-chain both-end type.

From the viewpoint of more efficiently obtaining the desired effects of the present invention, a both-end type, one-end type, side-chain type, or side-chain both-end type polyoxyalkylene-modified silicone oil is preferred. That is, the hydrophilic group is preferably a polyoxyalkylene group. More preferred is a side chain type polyoxyalkylene-modified silicone oil.

In a preferred embodiment, the polyoxyalkylene-modified silicone oil may be a synthetic product or a commercially available product.

Examples of commercially available both-end type polyoxyalkylene-modified silicone oils include X-22-4952, X-22-4272, and X-22-6266 (all manufactured by Shin-Etsu Chemical Co., Ltd.); FZ-2203, FZ-2207, FZ-2208, and FZ-2154 (all manufactured by Dow Corning Toray Silicone Co., Ltd.), Silsoft (registered trademark) 870 (manufactured by Momentive Performance Materials GK), and the like.

Examples of commercially available one-end polyoxyalkylene-modified silicone oils include FZ-2122 and FZ-720 (both manufactured by Dow Corning Toray Silicone Co., Ltd.), and the like.

Examples of commercially available side-chain type polyoxyalkylene modified silicone oils include DBE-224, DBE-621, DBE-712, DBE-814, DBE-821, DBP-732, DBP-534, YAD-122, YBD-125, and YMS-T31 (all manufactured by Gelest); KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, KF-6017, and X-22-2516 (all manufactured by Shin-Etsu Chemical Co., Ltd.); FZ-2110, FZ-2166, FZ-2164, FZ-2191, FZ-7001, FZ-2120, FZ-2130, FZ-2101, FZ-7002, FZ-2123, FZ-2104, FZ-2105, F Z-2118, FZ-2161, FZ-2162, SF8428, SH3771, BY16-036, and BY16-027 (all manufactured by Dow Corning Toray Silicone Co., Ltd.); TSF4440, TSF4441, TSF4445, TSF4446, TSF4450, TSF4452, TSF4453, TSF4460, SF1188A, Silsoft (registered trademark) 305, Silsoft (registered trademark) 430, Silsoft (registered trademark) 440, Silsoft (registered trademark) 475, Silsoft (registered trademark) 805, Silsoft (registered trademark) 810, Silsoft (registered trademark) 840, Silsoft (registered trademark) 875, Silsoft (registered trademark) 876, Silsoft (registered trademark) 880, and Silsoft (registered trademark) 895 (all manufactured by Momentive Performance Materials GK); and the like.

The polyoxyalkylene-modified silicone oil can be easily synthesized, for example, by the methods described in Japanese Patent Laid-Open Nos. 2002-179797, 2008-1896, 2008-1897, and the like, or a method in accordance therewith.

The lower limit of the weight average molecular weight of the polyorganosiloxane having a hydrophilic group is preferably 200 or more, more preferably 400 or more, and further preferably 600 or more. Further, the upper limit of the weight average molecular weight is preferably 100000 or less, more preferably 20000 or less, and further preferably 15000 or less. That is, the weight average molecular weight of the polyorganosiloxane having a hydrophilic group is preferably 200 or more and 100000 or less, more preferably 400 or more and 20000 or less, and further preferably 600 or more and 15000 or less. Within this range, the polyorganosiloxane having a hydrophilic group easily dissolves in the dispersing medium and the effect of improving the polishing removal rate can be easily obtained. Further, the stability of the polishing composition is also improved. The weight average molecular weight can be measured by the GPC method.

The lower limit of the concentration (content) of the polyorganosiloxane having a hydrophilic group in the polishing composition is not particularly limited, but relative to the total mass of the polishing composition, is preferably 0.0001% by mass (0.001 g/L) or more, more preferably 0.001% by mass (0.01 g/L) or more, and further preferably 0.005% by mass (0.05 g/L) or more. When the lower limit of the concentration (content) of the polyorganosiloxane having a hydrophilic group is within this range, the effect of improving the polishing removal rate can be efficiently obtained.

Further, the upper limit of the concentration (content) of the polyorganosiloxane having a hydrophilic group in the polishing composition is, relative to the total mass of the polishing composition, preferably 1% by mass (10 g/L) or less, more preferably 0.5% by mass (5 g/L) or less, further preferably 0.05% by mass (0.5 g/L) or less, and particularly preferably 0.03% by mass (0.3 g/L) or less. When the upper limit of the concentration (content) of the polyorganosiloxane having a hydrophilic group in the polishing composition is within this range, agglomeration of the abrasive grains can be suppressed.

Therefore, the range of the concentration (content) of polyorganosiloxane having a hydrophilic group is, relative to the total mass of the polishing composition, preferably 0.0001% by mass (0.001 g/L) or more and 1% by mass (10 g/L) or less, more preferably 0.001% by mass (0.01 g/L) or more and 0.5% by mass (5 g/L) or less, further preferably 0.005% by mass (0.05 g/L) or more and 0.05% by mass (0.5 g/L) or less, and particularly preferably 0.005% by mass (0.05 g/L) or more and 0.03% by mass (0.3 g/L) or less.

<Inorganic Acid Salt or Organic Acid Salt>

In some embodiments, the polishing composition according to the present invention may include an inorganic acid salt or an organic acid salt. The inorganic acid salt or organic acid salt can increase the electrical conductivity of the polishing composition, have an action of reducing the thickness of the electrostatic repulsion layer on the surface of the abrasive grains, thereby making it easier for the abrasive grains to get closer to the object to be polished and can improve the polishing removal rate of the object to be polished by the polishing composition. Examples of the inorganic acid salt or organic acid salt include inorganic acid salts such as ammonium sulfate, ammonium nitrate, potassium chloride, sodium sulfate, potassium nitrate, potassium carbonate, potassium tetrafluoroborate, potassium pyrophosphate, and potassium hexafluorophosphate; and organic acid salts such as potassium oxalate, trisodium citrate, and (+)-potassium tartrate. The inorganic acid salt or organic acid salt can be used alone or in combination of two or more.

The concentration (content) of the inorganic acid salt or organic acid salt in the polishing composition is, relative to the total mass of the polishing composition, preferably 0.1 g/kg or more, and more preferably 0.5 g/kg or more. Further, the concentration (content) of the inorganic acid salt or organic acid salt is, relative to the total mass of the polishing composition, preferably 10 g/kg or less, and more preferably 5 g/kg or less.

<Complexing Agent>

The complexing agent has an action of chemically etching the surface of the object to be polished, and can more effectively improve the polishing removal rate of the object to be polished by the polishing composition.

Examples of the complexing agent include inorganic acids or salts thereof, organic acids or salts thereof, nitrile compounds, amino acids, and chelating agents. These complexing agents may be used alone or in combination of two or more. Further, the complexing agent may be a commercially available product or a synthetic product.

A salt of an inorganic acid or organic acid may be used as the complexing agent. In particular, when a salt of a weak acid and a strong base, a salt of a strong acid and a weak base, or a salt of a weak acid and a weak base is used, a pH buffering effect can be expected. Examples of such salts include potassium chloride, sodium sulfate, potassium nitrate, potassium carbonate, potassium tetrafluoroborate, potassium pyrophosphate, potassium oxalate, trisodium citrate, (+)-potassium tartrate, potassium hexafluoroborate-phosphate, and the like.

Specific examples of the nitrile compounds include acetonitrile, aminoacetonitrile, propionitrile, butyronitrile, isobutyronitrile, benzonitrile, glutarodinitrile, methoxyacetonitrile, and the like.

Specific examples of the amino acids include glycine, α-alanine, β-alanine, N-methylglycine, N,N-dimethylglycine, 2-aminobutyric acid, norvaline, valine, leucine, norleucine, isoleucine, phenylalanine, proline, sarcosine, ornithine, lysine, taurine, serine, threonine, homoserine, tyrosine, bicine, tricine, 3,5-diiodo-tyrosine, β-(3,4-dihydroxyphenyl)-alanine, thyroxine, 4-hydroxy-proline, cysteine, methionine, ethionine, lanthionine, cystathionine, cystine, cysteic acid, aspartic acid, glutamic acid, S-(carboxymethyl)-cysteine, 4-aminobutyric acid, asparagine, glutamine, azaserine, arginine, canavanine, citrulline, δ-hydroxy-lysine, creatine, histidine, 1-methyl-histidine, 3-methyl-histidine, tryptophan, N-oleoylsarcosine, N-lauroylsarcosine, N-oleoylglutamic acid, N-lauroylglutamic acid, N-oleoylaspartic acid, N-lauroylaspartic acid, N-oleoyl-N-methylalanine, N-lauroyl-N-methylalanine, and the like.

Specific examples of the chelating agents include nitrilotriacetic acid, diethylenetriaminepentaacetic acid, ethylenediaminetetraacetic acid, N,N,N-trimethylenephosphonic acid, ethylenediamine-N,N,N',N'-tetramethylenesulfonic acid, transcyclohexanediaminetetraacetic acid, 1,2-diaminopropanetetraacetic acid, glycol ether diaminetetraacetic acid, ethylenediamineorthohydroxyphenylacetic acid, ethylenediaminedisuccinic acid (SS form), N-(2-carboxylate ethyl)-L-aspartic acid, β-alaninediacetic acid, 2-phosphonobutane-1,2,4-tricarboxylic acid, 1-hydroxyethylidene-1,1-diphosphonic acid, N,N'-bis (2-hydroxybenzyl) ethylenediamine-N,N'-diacetic acid, 1,2-dihydroxybenzene-4,6-disulfonic acid, and the like.

When the polishing composition contains a complexing agent, the concentration (content) of the complexing agent is not particularly limited. For example, although the lower limit of the concentration (content) of the complexing agent in the polishing composition is not particularly limited because an effect is exhibited even in small amounts, the lower limit of the concentration (content) is preferably 0.001 g/L or more, more preferably and 0.01 g/L or more, and further preferably 1 g/L or more. Further, the upper limit of the concentration (content) of the complexing agent in the polishing composition is preferably 20 g/L or less, more preferably 15 g/L or less, and further preferably 10 g/L or less. If the concentration (content) of the complexing agent in the polishing composition is within this range, the polishing removal rate of the object to be polished is improved, and this is favorable in improving the smoothness of the surface of the object to be polished after polishing with the polishing composition.

<Antifungal Agent (Antiseptic Agent)>

The antifungal agent (antiseptic agent) is not particularly limited, and can be appropriately selected in accordance with the desired use and purpose. Specific examples include isothiazoline antiseptic agents such as 2-methyl-4-isothiazolin-3-one, 5-chloro-2-methyl-4-isothiazolin-3-one, and 1,2-benziisothiazol-3 (2H)-one (BIT), paraoxybenzoic acid esters (parahydroxybenzoic acid esters) such as methyl paraoxybenzoate (methyl parahydroxybenzoate), ethyl paraoxybenzoate (ethyl parahydroxybenzoate), butyl paraoxybenzoate (butyl parahydroxybenzoate), and benzyl paraoxybenzoate (benzyl parahydroxybenzoate); aromatic compounds such as salicylic acid, methyl salicylate, phenol, catechol, resorcinol, hydroquinone, isopropylphenol, cresol, thymol, phenoxyethanol, phenylphenol (2-phenylphenol, 3-phenylphenol, 4-phenylphenol), and 2-phenylethyl alcohol (phenethyl alcohol); monounsaturated fatty acids such as crotonic acid, myristoleic acid, palmitoleic acid, oleic acid, and ricinoleic acid; diunsaturated fatty acids such as sorbic acid, linoleic acid, and eicosadienoic acid; triunsaturated fatty acids such as linolenic acid, pinolenic acid, and eleostearic acid; tetraunsaturated fatty acids such as stearidonic acid and arachidonic acid; pentaunsaturated fatty acids such as boseopentaenoic acid and eicosapentaenoic acid; hexaunsaturated fatty acids such as docosahexaenoic and nisic acid; 1,2-alkanediols such as 1,2-pentanediol, 1,2-hexanediol, and 1,2-octanediol; alkyl glyceryl ethers such as 2-ethylhexylglyceryl ether (ethylhexylglycerin); compounds such as capric acid and dehydroacetic acid, and the like. It is noted that 1,2-benziisothiazol-3 (2H)-one (BIT) and the like can also play the role of a pH adjusting agent.

Further, in the case of a polishing composition (that is, a concentrated solution or a working slurry stock solution) that is diluted and used for polishing, the concentration (content) of the antifungal agent (antiseptic agent) is, from the viewpoint of improving the polishing removal rate, usually suitably 10% by mass or less, and more preferably 5% by mass or less. In addition, from the viewpoint of reducing the burden of treating the polishing composition after polishing, that is, a waste water treatment, the concentration (content) of the antifungal agent (antiseptic agent) is preferably 0.1% by mass or more, and more preferably 1% by mass or more.

[Forms of Polishing Composition]

The polishing composition according to the present invention is typically supplied to an object to be polished in the form of a polishing liquid containing the polishing composition, and used for polishing the object to be polished. The polishing composition according to the present invention may, for example, be diluted (typically diluted with water) and used as a polishing liquid, or it may be used as a polishing liquid as it is. That is, the concept of the polishing composition according to the present invention includes both a polishing composition (working slurry) that is supplied to an object to be polished and used for polishing the object to be polished, and a concentrated liquid (slurry stock solution) that is diluted and used for polishing. The concentration factor of the concentrated liquid can be, for example, about 2 times or more and 100 times or less on a volume basis, and usually about 3 times or more and 50 times or less is suitable.

[Object to be Polished]

The object to be polished in the present invention is not particularly limited, and examples include single crystal silicon, polycrystalline silicon (polysilicon), polycrystalline silicon doped with n-type or p-type impurities, non-crystalline silicon (amorphous silicon), non-crystalline silicon doped with n-type or p-type impurities, silicon oxide, silicon nitride, silicon carbonitride (SiCN), metals, SiGe, carbon-containing materials, and the like.

Examples of objects to be polished containing silicon oxide include TEOS type silicon oxide films (hereinafter also simply referred to as "TEOS" and "TEOS film") produced using tetraethyl orthosilicate as a precursor, HDP (high density plasma) films, USG (undoped silicate glass) films, PSG (phosphorus silicate glass) films, BPSG (boron-phospho silicate glass) films, RTO (rapid thermal oxidation) films, and the like.

Examples of the metals include tungsten, copper, aluminum, cobalt, hafnium, nickel, gold, silver, platinum, palladium, rhodium, ruthenium, iridium, osmium, and the like.

Examples of the carbon-containing materials include amorphous carbon, spin-on carbon (SOC), diamond-like carbon (DLC), nanocrystalline diamond, and graphene; SiOC (carbon-containing silicon oxide in which $SiO_2$ is doped with C), which is a low dielectric constant (Low-k) material, silicon carbide; and the like. A film containing a carbon-containing material can be formed by CVD, PVD, spin coating method, or the like.

The object to be polished may be a commercially available product or may be produced by a known method.

Among these, an object to be polished that contains silicon oxide and silicon nitride is preferred. Thus, according to a preferred embodiment of the present invention, the polishing composition is used for polishing an object to be polished that contains silicon oxide and silicon nitride.

<Polishing Removal Rate>

As described above, the polishing composition according to the present invention can polish both silicon oxide and silicon nitride at high polishing removal rate. In the present invention, the polishing removal rate of the silicon oxide film is preferably 300 Å/min or higher, more preferably 500 Å/min or higher, and further preferably 600 Å/min or higher. Further, the polishing removal rate of the silicon nitride film is preferably 300 Å/min or higher, more preferably 350 Å/min or higher, and further preferably 400 Å/min or higher.

<Selectivity>

When selectivity is calculated by dividing the polishing removal rate (Å/min) of the silicon oxide film by the polishing removal rate (Å/min) of the silicon nitride film, in the then the present invention, selectivity ($SiO_2/Si_3N_4$) is preferably 1.0 or more and 2.0 or less, more preferably 1.1 or more and 1.5 or less, and further preferably 1.2 or more and 1.4 or less.

[Method for Producing Polishing Composition]

The method for producing the polishing composition according to the present embodiment is not particularly limited, and the polishing composition can be obtained, for example, by stirring and mixing the abrasive grains, the acidic compound, and the other additives to be added as necessary. The details of each component are as described above.

The temperature at which each component is mixed is not particularly limited, but is preferably 10° C. or higher and 40° C. or lower, and the components may be heated to increase the rate of dissolution. Further, the mixing time is not particularly limited as long as uniform mixing can be achieved.

[Polishing Method and Method for Producing Semiconductor Substrate]

As described above, the polishing composition according to the present embodiment is particularly suitably used for polishing an object to be polished containing silicon oxide and silicon nitride. Therefore, the present invention provides a polishing method for polishing an object to be polished containing silicon oxide and silicon nitride using the polishing composition according to the present embodiment.

Further, the present invention provides a method for producing a semiconductor substrate, which includes polishing a semiconductor substrate containing silicon oxide and silicon nitride by the polishing method described above.

As a polishing device, a common polishing device equipped with a holder that holds a substrate or the like having the object to be polished, a motor that can change the rotational speed, and the like, and which has a platen to which a polishing pad (polishing cloth) can be attached, can be used.

As the polishing pad, common nonwoven fabrics, polyurethane, porous fluororesin, and the like can be used without particular limitation. Preferably, the polishing pad has grooves that allow a polishing liquid to collect therein.

Regarding the polishing conditions, for example, the rotational speed of the platen and carrier is preferably 10 rpm (0.17 $s^{-1}$) or higher and 500 rpm (8.33 $s^{-1}$) or lower. The pressure (polishing pressure) applied to the substrate having the object to be polished is preferably 0.5 psi (3.45 kPa) or more and 10 psi (68.9 kPa) or less.

The method for supplying the polishing composition to the polishing pad is also not particularly limited, and for example, a method in which the polishing composition is continuously supplied with a pump or the like may be employed. Although there is no limit to the supplied amount, it is preferred that the surface of the polishing pad is always covered with the polishing composition according to the present invention.

The polishing composition according to the present embodiment may be of a one-component type or a multi-component type such as a two-component type. Further, the polishing composition according to the present invention may be prepared by diluting a stock solution of the polishing composition, for example, by a factor of three or more using a diluent such as water.

Although embodiments of the present invention have been described in detail, it is to be understood that these embodiments are illustrative and exemplary, and not restrictive, and thus the scope of the invention is to be construed in accordance with the appended aspects.

The present invention includes the following aspects and modes.

1. A polishing composition including abrasive grains and an acidic compound, wherein the abrasive grains are inorganic particles having an organic acid immobilized on a surface thereof, and in a particle size distribution of the abrasive grains measured by a dynamic light scattering method, D90/D10 is 2.2 or more and D50 is 70 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass.

2. The polishing composition according to 1., wherein the inorganic particles are colloidal silica.

3. The polishing composition according to 1. or 2., wherein the abrasive grains have a true density of 1.7 $g/cm^3$ or more.

4. The polishing composition according to any of 1. to 3., wherein the abrasive grains have a true density of 2.0 $g/cm^3$ or more.

5. The polishing composition according to any of 1. to 4., wherein the abrasive grains have an average primary particle size of 30 nm or more.

6. The polishing composition according to any of 1. to 5., wherein the abrasive grains have an average secondary particle size of 70 nm or more.

7. The polishing composition according to any of 1. to 6., wherein a concentration of the abrasive grains in the polishing composition is 0.1% by mass or more and 15% by mass or less.

8. The polishing composition according to any of 1. to 7., having a pH of 1 or more and less than 5.

9. The polishing composition according to any of 1. to 8., wherein the acidic compound includes an inorganic acid.

10. The polishing composition according to 9., wherein the inorganic acid includes at least one selected from the group consisting of nitric acid, sulfuric acid, and hydrochloric acid.

11. The polishing composition according to any of 1. to 10., further including a dispersing medium.

12. The polishing composition according to any of 1. to 11., which is substantially free of an oxidizing agent.

13. The polishing composition according to any of 1. to 12., which is used for polishing an object to be polished containing silicon oxide and silicon nitride.

14. A polishing method, including polishing an object to be polished containing silicon oxide and silicon nitride using the polishing composition according to any of 1. to 13.

15. A method for producing a semiconductor substrate, including a step of polishing a semiconductor substrate containing silicon oxide and silicon nitride by the polishing method according to 14.

EXAMPLES

The present invention will now be explained in greater detail with the following Examples and Comparative Examples. However, the technical scope of the present invention is not limited to only the following examples. Further, unless otherwise specified, "%" and "parts" mean "% by mass" and "parts by mass", respectively. In addition, in the following examples, unless otherwise specified, operations were performed under conditions of room temperature (20° C. or higher and 25° C. or lower)/relative humidity of 40% RH or higher and 50% RH or lower. The physical properties were measured as follows.

<Average Primary Particle Size of Abrasive Grains>

The average primary particle size of the abrasive grains was calculated based on the formula 6000/[true density ($g/cm^3$)×BET value ($m^2/g$)] from the specific surface area (BET value) of silica particles measured by the BET method using "Flow Sorb II 2300" manufactured by Micromeritics and the true density of the silica particles.

<Average Secondary Particle Size of Abrasive Grains>

The average secondary particle size of the abrasive grains was measured as a volume average particle size (volume-based arithmetic mean diameter; Mv) using a dynamic light scattering particle size/particle size distribution apparatus UPA-UTI151 (manufactured by Nikkiso Co., Ltd.).

<True Density>

The true density of the abrasive grains was measured by the following method. Specifically, first, an aqueous silica solution was placed in a crucible so that the solid content (silica) was about 15 g, and the water was evaporated at about 200° C. using a commercially available hot plate. Further, in order to remove the moisture remaining in the voids of the abrasive grains, a heat treatment was performed at 300° C. for 1 hour in an electric furnace (calcination furnace, manufactured by Advantech Co., Ltd.), and the dried abrasive grains after the treatment were crushed in a mortar. Next, 10 g of the dried abrasive grains prepared above was added to a 100 ml pycnometer (Wa (g)) whose weight had been measured in advance using a precision balance (GH-202, manufactured by A&D Company), and a weight (Wb (g)) was measured. Then, 20 ml of ethanol was added, and the mixture was degassed for 30 minutes in a desiccator under reduced pressure. Then, the inside of the pycnometer was filled with ethanol, the pycnometer was stoppered, and a weight (Wc (g)) was measured. After the weight measurement of the abrasive grains was completed, the contents of the pycnometer were discarded, the pycnometer was washed, then filled with ethanol, and a weight (Wd (g)) was measured. From these weights and the temperature of the ethanol (t (C)) at the time of measurement, the true density was calculated based on the following expression (A) and expression (B).

[Expression 1]

$$Ld = 0.80653 - 0.000867 \times t \qquad \text{Expression (A)}$$

In expression (A), Ld represents the specific gravity of the ethanol (unit: g/cm$^3$) at t° C.

[Expression 2]

$$Sg = (Wb - Wa)/(Wd - Wc + Wb - Wa) \times Ld \qquad \text{Expression (B)}$$

In expression (B),

Sg represents the true density of the abrasive grains (unit: g/cm$^3$),

Wa represents the weight of the pycnometer (unit: g),

Wb represents the total weight (unit: g) of the sample (dried abrasive grains) and the pycnometer, Wc represents the total weight (unit: g) of the sample (dried abrasive grains), the ethanol, and the pycnometer, Wb represents the total weight of the ethanol and the pycnometer (unit: g), and Ld represents the specific gravity (unit: g/cm$^3$) of the ethanol determined by expression (A) above.

<Silanol Group Density of Abrasive Grains>

The silanol group density (number of silanol groups per unit surface area of the abrasive grains, unit: groups/nm$^2$) of the abrasive grains is calculated based on the following expression (C) after measuring or calculating each parameter using the following measurement method or calculation method.

More specifically, in the following expression (C), C is the total weight of the abrasive grains and S is the BET specific surface area of the abrasive grains. Even more specifically, first, 1.50 g of the abrasive grains as a solid content was collected in a 200 ml beaker, 100 ml of pure water was added to form a slurry, and 30 g of sodium chloride was added and dissolved. Next, IN hydrochloric acid was added to adjust the pH of the slurry to about 3.0 to 3.5, and then pure water was added until the slurry reached 150 ml. Using an automatic titrator (COM-80, manufactured by Hiranuma Co., Ltd.), the slurry was adjusted to a pH of 4.0 using a 0.1 mol/L sodium hydroxide aqueous solution at 25° C., and a volume a [unit: ml] of the 0.1 mol/L sodium hydroxide aqueous solution required to raise the pH from 4.0 to 9.0 by pH titration was measured. The silanol group density ρ can be calculated based on the expression (C) below.

[Expression 3]

$$\rho = (a \times 60.2)/(C \cdot S) \qquad \text{Expression (C)}$$

ρ: silanol group density [unit: groups/nm$^2$]

a: volume of the 0.1 mol/L sodium hydroxide aqueous solution [unit: ml]

C: weight of the abrasive grains [unit: g]

S: BET specific surface area of the abrasive grains [unit: m$^2$/g]

For the BET specific surface area of the abrasive grains, a value measured by a surface area measuring device (Flow Sorb II 2300), manufactured by Micromeritics, was used.

<D10, D50, and D90 of Abrasive Grains>

In a particle size distribution obtained using a dynamic light scattering particle size/particle size distribution apparatus UPA-UTI151 (manufactured by Nikkiso Co., Ltd.), D10 is the diameter of the abrasive grains when a cumulative particle mass from a fine particle side reaches 10% of the total particle mass, D50 is the diameter of the abrasive grains when the cumulative particle mass from the fine particle side reaches 50% of the total particle mass, and D90 is the diameter of the abrasive grains when the cumulative particle mass from the fine particle side reaches 90% of the total particle mass.

<Zeta Potential of Abrasive Grains>

The zeta potential of the abrasive grains in the polishing composition was calculated by placing the polishing composition in an ELS-Z2 manufactured by Otsuka Electronics Co., Ltd., performing measurement by the laser Doppler method (electrophoretic light scattering using a flow cell at a measurement measurement method) temperature of 25° C., and analyzing the obtained data using the Smoluchowski equation.

<pH of Polishing Composition>

The pH of the polishing composition was measured using a glass electrode type hydrogen ion concentration indicator (manufactured by Horiba, Ltd., model number: F-23). Specifically, a three-point calibration was performed using standard buffers (phthalate pH buffer pH: 4.01)(25° ° C., neutral phosphate pH buffer pH: 6.86 (25° C.), and carbonate pH buffer pH: 10.01 (25° C.)), the glass electrode was then placed in the polishing composition, and the pH was measured once the value had stabilized after 2 minutes or more had passed.

<Electrical Conductivity of Polishing Composition>

The electrical conductivity (EC) of the polishing composition was measured using a tabletop electrical conductivity meter (manufactured by Horiba, Ltd., model number: DS-71 LAQUA (registered trademark)).

Example 1

<Synthesis of Colloidal Silica Having an Organic Acid Immobilized on a Surface Thereof (Organic Acid-Immobilized Colloidal Silica)>

A mixture of 20 mL of ethanol and 1 mL of 3-mercaptopropyltrimethoxysilane was added to 900 mL of colloidal silica (solid content: 20% by mass, synthesized by the sodium silicate method), and the resultant mixture was heated at 70° C. for 18 hours. Then, 80 mL of a 31% by mass aqueous hydrogen peroxide solution was added, and the mixture was heated at 65° C. for 18 hours. After heating, ethanol was removed using an evaporator to synthesize colloidal silica having sulfonic acid immobilized on a surface thereof (sulfonic acid-immobilized colloidal silica).

<Preparation of Polishing Composition>

The sulfonic acid-immobilized colloidal silica obtained above was added to water as a dispersing medium so that the final concentration was 3% by mass, and 60% by mass of nitric acid was added so that the pH of the composition was 1.0. Then, the mixture was stirred and mixed at a temperature of 20° ° C. for 10 minutes to prepare a polishing composition.

Example 2

A polishing composition was prepared in the same manner as in Example 1, except that the 60% by mass nitric acid was added so that the pH of the composition was 2.0.

Example 3

A polishing composition was prepared in the same manner as in Example 1, except that the 60% by mass nitric acid was added so that the pH of the composition was 3.0.

Example 4

A polishing composition was prepared in the same manner as in Example 1, except that the 60% by mass nitric acid was added so that the pH of the composition was 4.0.

Example 5

A polishing composition was prepared in the same manner as in Example 2, except that in the synthesis of the colloidal silica having an organic acid immobilized on a surface thereof, as the colloidal silica of the raw material, colloidal silica having a solid content concentration of 50% by mass that had been synthesized by the sodium silicate method was used.

Example 6

A polishing composition was prepared in the same manner as in Example 2, except that in the synthesis of the colloidal silica having an organic acid immobilized on a surface thereof, as the colloidal silica of the raw material, colloidal silica having a solid content concentration of 23% by mass that had been synthesized by the sol-gel method was used.

Comparative Example 1

A polishing composition was prepared in the same manner as in Example 2, except that in the synthesis of the colloidal silica having an organic acid immobilized on a surface thereof, as the colloidal silica of the raw material, colloidal silica having a solid content concentration of 23% by mass that had been synthesized by the sol-gel method was used.

Comparative Example 2

A polishing composition was prepared in the same manner as in Example 2, except that in the synthesis of the colloidal silica having an organic acid immobilized on a surface thereof, as the colloidal silica of the raw material, colloidal silica having an average primary particle size of 35 nm (solid content concentration: 20% by mass, synthesized by the sol-gel method) was used.

Comparative Example 3

A polishing composition was prepared in the same manner as in Example 2, except that synthesis of the colloidal silica having an organic acid immobilized on a surface thereof was not carried out, and the colloidal silica of the raw material was used as is as the abrasive grains.

Comparative Example 4

A polishing composition was prepared in the same manner as in Example 2, except that in the synthesis of the colloidal silica having an organic acid immobilized on a surface thereof, as the colloidal silica of the raw material, colloidal silica having a solid content concentration of 20% by mass that had been synthesized by the sol-gel method was used.

Evaluation

As the object to be polished, the following were prepared.

A 200 mm wafer ($Si_3N_4$ (silicon nitride film), manufactured by Advance Materials Technology, Inc., product name: LP-SiN 3.5KA Blanket.

A 200 mm wafer ($SiO_2$ (silicon oxide film, film produced using tetraethyl orthosilicate as a precursor, manufactured by Advance Materials Technology Inc., product name: P-TEOS 10KA Blanket).

Using the polishing composition obtained above, each wafer was polished under the following polishing conditions, and the polishing removal rate was measured. Further, the ratio of the polishing removal rate of the silicon oxide to the polishing removal rate of the silicon nitride (selectivity, $SiO_2/Si_3N_4$) was calculated.

<Polishing Conditions>

Polishing machine: CMP single-sided polishing machine for 200 mm wafers

Polishing pad: polyurethane pad (IC1010, manufactured by Nitta DuPont Incorporated)

Pressure: 3.0 psi (20.685 kPa)

Platen (surface plate) rotational speed: 123 rpm

Head (carrier) rotational speed: 117 rpm

Polishing composition flow rate: 200 ml/min

Polishing time: 1 minute.

<Polishing Removal Rate>

The polishing removal rate (polishing rate) of the object to be polished was calculated using the following expression.

Polishing removal rate [Å/min]=(film thickness [A] before polishing−film thickness [A] after polishing)/polishing time [min] [Expression 4]

The film thickness of the object to be polished before and after polishing was determined by a light interference type film thickness measurement apparatus (manufactured by KLA-Tencor Co., Ltd., model number: A-SET), and evaluated by dividing the difference by the polishing time.

Table 1 below shows the compositional make up of the polishing compositions and the polishing removal rate evaluation results of the Examples and Comparative Examples.

TABLE 1

| | Abrasive Grains | | | | | | | | | |
|---|---|---|---|---|---|---|---|---|---|---|
| | Surface | Raw Material Silica Synthesis Method | Average Primary Particle Size (nm) | Average Secondary Particle Size (nm) | Degree of Association | True Density ($g/cm^3$) | Silanol Group Density ($groups/nm^2$) | Shape | D10 (nm) | D50 (nm) |
| Example 1 | organic acid immobilized | sodium silicate method | 57 | 103 | 1.81 | 2.05 | 1.47 | cocoon-like | 61 | 97 |
| Example 2 | organic acid immobilized | sodium silicate method | 57 | 103 | 1.81 | 2.05 | 1.47 | cocoon-like | 61 | 97 |
| Example 3 | organic acid immobilized | sodium silicate method | 57 | 103 | 1.81 | 2.05 | 1.47 | cocoon-like | 61 | 97 |
| Example 4 | organic acid immobilized | sodium silicate method | 57 | 103 | 1.81 | 2.05 | 1.47 | cocoon-like | 61 | 97 |
| Example 5 | organic acid immobilized | sodium silicate method | 34 | 76 | 2.24 | 2.06 | 1.84 | spherical | 55 | 88 |
| Example 6 | organic acid immobilized | sol-gel method | 90 | 202 | 2.24 | 1.72 | 7.90 | cocoon-like | 117 | 190 |
| Comparative Example 1 | organic acid immobilized | sol-gel method | 78 | 113 | 1.45 | 1.81 | 6.58 | cocoon-like | 82 | 110 |
| Comparative Example 2 | organic acid immobilized | sol-gel method | 35 | 60 | 1.71 | 1.83 | 5.70 | cocoon-like | 40 | 59 |
| Comparative Example 3 | not immobilized | sodium silicate method | 57 | 103 | 1.81 | 2.05 | 1.47 | cocoon-like | 61 | 97 |
| Comparative Example 4 | organic acid immobilized | sol-gel method | 12 | 34 | 2.83 | 1.82 | 2.11 | cocoon-like | 14 | 34 |

| | Abrasive Grains | | | Polishing Composition | | Evaluation Polishing removal rate | | |
|---|---|---|---|---|---|---|---|---|
| | D90 (nm) | D90/D10 | Zeta potential (mV) | pH | EC (mS/cm) | $Si_3N_4$ (Angstrom/min) | $SiO_2$ (Angstrom/min) | Selectivity $SiO_2/Si_3N_4$ |
| Example 1 | 155 | 2.54 | −10 | 1 | 15 | 321 | 710 | 1.14 |
| Example 2 | 155 | 2.54 | −30 | 2 | 5 | 497 | 671 | 1.35 |
| Example 3 | 155 | 2.54 | −38 | 3 | 3 | 458 | 612 | 1.34 |
| Example 4 | 155 | 2.54 | −42 | 4 | 2 | 384 | 532 | 1.38 |
| Example 5 | 145 | 2.64 | −30 | 2 | 5 | 487 | 610 | 1.25 |
| Example 6 | 312 | 2.67 | −30 | 2 | 5 | 311 | 330 | 1.06 |
| Comparative Example 1 | 148 | 1.80 | −30 | 2 | 5 | 356 | 89 | 0.25 |
| Comparative Example 2 | 87 | 2.18 | −30 | 2 | 5 | 389 | 47 | 0.12 |
| Comparative Example 3 | 155 | 2.54 | −2 | 2 | 5 | 258 | 683 | 2.65 |
| Comparative Example 4 | 41 | 2.91 | −40 | 2 | 5 | 457 | 30 | 0.07 |

As is clear from Table 1, when the polishing compositions of the Examples were used, it was found that both silicon oxide and silicon nitride could be polished at high polishing removal rates.

Table 1 shows the results obtained by polishing an object to be polished having a silicon oxide film and an object to be polished having a silicon nitride film separately, but it is presumed that similar polishing removal rates and selectivity results would be obtained even when polishing an object to be polished having both a silicon oxide film and a silicon nitride film.

The present application is based on Japanese Patent Application No. 2022-208135 filed on Dec. 26, 2022, which is herein incorporated by reference in its entirety.

The invention claimed is:

1. A polishing composition comprising abrasive grains and an acidic compound, wherein the abrasive grains are inorganic particles having an organic acid immobilized on a surface thereof, and in a particle size distribution of the abrasive grains measured by a dynamic light scattering method, D90/D10 is 2.40 or more and D50 is 85 nm or more, where D10 is a particle diameter when a cumulative particle mass from a fine particle side reaches 10% of the total particle mass, D50 is a particle diameter when the cumulative particle mass from the fine particle side reaches 50% of the total particle mass, and D90 is a particle diameter when the cumulative particle mass from the fine particle side reaches 90% of the total particle mass, and wherein the abrasive grains have a true density of 2.0 $g/cm^3$ or more.

2. The polishing composition according to claim 1, wherein the inorganic particles are colloidal silica.

3. The polishing composition according to claim 1, wherein the abrasive grains have an average primary particle size of 30 nm or more.

4. The polishing composition according to claim 1, wherein the abrasive grains have an average secondary particle size of 70 nm or more.

5. The polishing composition according to claim 1, wherein a concentration of the abrasive grains in the polishing composition is 0.1% by mass or more and 15% by mass or less.

6. The polishing composition according to claim 1, having a pH of 1 or more and less than 5.

7. The polishing composition according to claim 1, wherein the acidic compound comprises an inorganic acid.

8. The polishing composition according to claim 7, wherein the inorganic acid comprises at least one selected from the group consisting of nitric acid, sulfuric acid, and hydrochloric acid.

9. The polishing composition according to claim 1, further comprising a dispersing medium.

10. The polishing composition according to claim 1, which is substantially free of an oxidizing agent.

11. The polishing composition according to claim 1, which is used for polishing an object to be polished containing silicon oxide and silicon nitride.

12. The polishing composition according to claim 1, wherein the number of silanol groups per unit surface area of the abrasive grains is 0.5 groups/$nm^2$ or more and 5.0 groups/$nm^2$ or less.

13. The polishing composition according to claim 1, wherein the polishing composition does not contain a water-soluble polymer.

14. The polishing composition according to claim 1, wherein the abrasive grains are colloidal silica particles obtained by a sodium silicate method.

15. The polishing composition according to claim 1, wherein an electrical conductivity of the polishing composition is 0.5 mS/cm or more and 10 mS/cm or less.

16. The polishing composition according to claim 1, wherein the zeta potential of the abrasive grains in the polishing composition is −35 mV or more and −20 mV or less.

17. A polishing method, comprising polishing an object to be polished containing silicon oxide and silicon nitride using the polishing composition according to claim 1.

18. A method for producing a semiconductor substrate, comprising a step of polishing a semiconductor substrate containing silicon oxide and silicon nitride by the polishing method according to claim 17.

* * * * *